(12) United States Patent
Shen et al.

(10) Patent No.: US 12,101,760 B2
(45) Date of Patent: *Sep. 24, 2024

(54) COMMUNICATION METHOD AND COMMUNICATION APPARATUS

(71) Applicant: HUAWEI TECHNOLOGIES CO., LTD., Shenzhen (CN)

(72) Inventors: Zukang Shen, Beijing (CN); Yan Cheng, Beijing (CN); Hao Sun, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 495 days.

This patent is subject to a terminal disclaimer.

(21) Appl. No.: 16/902,201

(22) Filed: Jun. 15, 2020

(65) Prior Publication Data

US 2020/0314877 A1    Oct. 1, 2020

Related U.S. Application Data

(63) Continuation of application No. 16/234,612, filed on Dec. 28, 2018, now Pat. No. 10,716,128, which is a
(Continued)

(30) Foreign Application Priority Data

Dec. 9, 2017    (CN) .......................... 201711299567.3

(51) Int. Cl.
*H04W 72/12*    (2023.01)
*H04B 7/06*    (2006.01)
(Continued)

(52) U.S. Cl.
CPC ...... *H04W 72/1268* (2013.01); *H04B 7/0626* (2013.01); *H04L 1/0026* (2013.01);
(Continued)

(58) Field of Classification Search
CPC ... H04L 5/0055; H04L 5/0057; H04L 1/0026; H04L 1/1671; H04L 1/1812;
(Continued)

(56) References Cited

U.S. PATENT DOCUMENTS

2011/0243066 A1    10/2011    Nayeb Nazar et al.
2014/0293921 A1    10/2014    Tang et al.
(Continued)

FOREIGN PATENT DOCUMENTS

CN    103178926 A    6/2013
CN    103188033 A    7/2013
(Continued)

OTHER PUBLICATIONS

MediaTek Inc., "Discussion on UCI multiplexing", 3GPP TSG RAN WG1 Meeting 90bis R1-1718342, Prague, CZ, Oct. 9-13, 2017, total 11 pages.
(Continued)

*Primary Examiner* — Walli Z Butt
(74) *Attorney, Agent, or Firm* — Rimon PC

(57)    ABSTRACT

A terminal device determines a resource of a physical uplink control channel. The physical uplink control channel carries a first encoded bit sequence and a second encoded bit sequence, the first encoded bit sequence is corresponding to first uplink control information, and the second encoded bit sequence is corresponding to second uplink control information. The resource for the physical uplink control channel includes N orthogonal frequency division multiplexing (OFDM) symbol sets. The first encoded bit sequence is carried in an OFDM symbol included in j OFDM symbol sets, the j OFDM symbol sets are a part of or all of of the N OFDM symbol sets, where j is a positive integer less than or equal to N. The terminal device sends, on the resource for the physical uplink control channel, a signal that is generated
(Continued)

based on the first uplink control information and the second uplink control information.

29 Claims, 3 Drawing Sheets

Related U.S. Application Data continuation of application No. PCT/CN2018/093974, filed on Jul. 2, 2018.

(51) Int. Cl.
| | |
|---|---|
| *H04L 1/00* | (2006.01) |
| *H04L 1/1607* | (2023.01) |
| *H04L 1/1812* | (2023.01) |
| *H04L 1/1829* | (2023.01) |
| *H04L 5/00* | (2006.01) |
| *H04W 72/1268* | (2023.01) |
| *H04W 72/23* | (2023.01) |

(52) U.S. Cl.
CPC .......... *H04L 1/1671* (2013.01); *H04L 1/1812* (2013.01); *H04L 1/1861* (2013.01); *H04L 5/0007* (2013.01); *H04L 5/0053* (2013.01); *H04W 72/23* (2023.01)

(58) Field of Classification Search
CPC ... H04L 1/1861; H04L 5/0007; H04L 5/0053; H04L 1/0072; H04L 5/0094; H04W 72/1268; H04W 72/23; H04B 7/0626
See application file for complete search history.

(56) References Cited

U.S. PATENT DOCUMENTS

| | | | |
|---|---|---|---|
| 2014/0301324 A1 | 10/2014 | Cheng et al. | |
| 2015/0043462 A1* | 2/2015 | Hwang | H04L 1/0026 370/329 |
| 2015/0173102 A1 | 6/2015 | Ruiz Delgado et al. | |
| 2015/0358125 A1 | 12/2015 | Yang et al. | |
| 2016/0192388 A1 | 6/2016 | Ekpenyong et al. | |
| 2016/0248553 A1 | 8/2016 | Shimezawa et al. | |
| 2017/0041923 A1 | 2/2017 | Park | |
| 2017/0070277 A1 | 3/2017 | Si et al. | |
| 2017/0273075 A1 | 9/2017 | Nogami et al. | |
| 2017/0318575 A1 | 11/2017 | Park et al. | |
| 2018/0352545 A1 | 12/2018 | Takeda et al. | |
| 2019/0082431 A1* | 3/2019 | Yi | H04W 72/0446 |
| 2020/0281013 A1* | 9/2020 | Li | H04B 7/0632 |
| 2023/0025287 A1* | 1/2023 | Choi | H04L 5/0053 |

FOREIGN PATENT DOCUMENTS

| | | |
|---|---|---|
| CN | 105027654 A | 11/2015 |
| CN | 105474728 A | 4/2016 |
| CN | 105053322 A | 10/2016 |
| CN | 106850157 A | 6/2017 |
| CN | 107104780 A | 8/2017 |
| RU | 2557164 C2 | 7/2015 |
| WO | 2017019132 A1 | 2/2017 |
| WO | 2017051724 A1 | 3/2017 |

OTHER PUBLICATIONS

R 1-1721003, Ericsson : "On the Design of Long PUCCH for more than 2 bits", 3GPP TSG RAN WG1 Meeting#90bis. Reno, USA, Nov. 27-Dec. 1, 2017. 8 pages.

R1-1721006, Ericsson: "On PUCCH Resource Allocation", 3GPP TSG-RAN WG1 Meeting RAN1#91. Reno, Nevada, United States, Nov. 27-Dec. 1, 2017. 11 pages.

3GPP TS 38.212 V1.2.D (Nov. 2017), 3rd Generation Partnership Project; Technical Specification Group Radio Access Network; NR; Multiplexing and channel coding(Release 15), Nov. 2017. 42 pages. R1—1721049.

3GPP TSG RAN \IVG1 Meeting #92 R1-180xxxx, MCC Support:"draft report of 3gpp tsg ran wg1 #91 v0.2.0", (Reno, USA, Nov. 27-Dec. 1, 2017). 207 pages.

* cited by examiner

COMMUNICATION METHOD AND COMMUNICATION APPARATUS

CROSS-REFERENCE TO RELATED APPLICATIONS

This application is a continuation of U.S. application Ser. No. 16/234,612, filed on Dec. 28, 2018, which is a continuation of International Application No. PCT/CN2018/093974, filed on Jul. 2, 2018, which claims priority to Chinese Patent Application No. 201711299567.3, filed on Dec. 9, 2017. All of the afore-mentioned patent applications are hereby incorporated by reference in their entireties.

TECHNICAL FIELD

Embodiments of the present disclosure relate to the communication field, and more specifically, to a communication method and a communication apparatus.

BACKGROUND

In a Long Term Evolution (LTE) system, uplink control information (UCI) is sent by using a physical uplink control channel (PUCCH). One PUCCH occupies a plurality of orthogonal frequency division multiplexing (OFDM) or discrete Fourier transform-spread-orthogonal frequency division multiplexing (DFT-s-OFDM) symbols in one slot. In this application, both the OFDM symbol and the DFT-s-OFDM symbol are referred to as an OFDM symbol.

Five physical uplink control channel formats are supported in a 5G system. A physical uplink control channel format 3 or a physical uplink control channel format 4 occupies 4 to 14 OFDM symbols in time domain, and can be used to carry uplink control information including more than two original bits. The uplink control information includes a hybrid automatic repeat request-acknowledgment (HARQ-ACK), channel state information (CSI), and the like. In the CSI, information such as a channel quality indicator (CQI) of a first codeword or a rank indication (RI) is defined as type 1 (Type 1) CSI, and information such as a CQI of a second codeword or a precoding matrix indicator (PMI) is defined as type 2 (Type 2) CSI. When the HARQ-ACK, the type 1 CSI, and the type 2 CSI are simultaneously transmitted, the HARQ-ACK and the type 1 CSI are jointly encoded, and the type 2 CSI is independently encoded.

However, currently, there is no solution for sending a physical uplink control channel with the foregoing format.

SUMMARY

Embodiments of the present disclosure provide a communication method and a communication apparatus, to provide a solution for sending a physical uplink control channel.

According to a first aspect, a communication method is provided. A terminal device determines a physical uplink control channel resource. The terminal device sends, on the physical uplink control channel resource, a signal that is generated based on first uplink control information and second uplink control information.

According to a second aspect, a communication method is provided. An access network device determines a physical uplink control channel resource. The access network device receives, on the physical uplink control channel resource, a signal that is generated based on first uplink control information and second uplink control information.

According to a third aspect, a communication apparatus is provided. The apparatus includes a processor and a memory coupled to the processor. The memory is configured to store a program. The processor is configured to execute the program. When the program is executed, the processor is configured to implement the following steps: determining a physical uplink control channel resource, and sending, on the physical uplink control channel resource, a signal that is generated based on first uplink control information and second uplink control information.

The communication apparatus in the third aspect may be a terminal device, or may be at least one processor in a terminal device, for example, a modem processor. When the communication apparatus is the at least one processor, the signal sending step may be actions of mapping the signal to the resource and outputting the signal to another chip.

According to a fourth aspect, a communication apparatus is provided. The apparatus includes a processor and a memory coupled to the processor. The memory is configured to store a program. The processor is configured to execute the program. When the program is executed, the processor is configured to implement the following steps: determining a physical uplink control channel resource, and receiving, on the physical uplink control channel resource, a signal that is generated based on first uplink control information and second uplink control information.

The communication apparatus in the fourth aspect may be an access network device, or may be at least one processor in an access network device, for example, a modem processor. When the communication apparatus is the at least one processor, the signal receiving step may be actions of reading the signal from another chip and decoding the signal.

The physical uplink control channel carries a first encoded bit sequence and a second encoded bit sequence. The first encoded bit sequence is corresponding to the first uplink control information, and the second encoded bit sequence is corresponding to the second uplink control information. The first uplink control information includes an HARQ-ACK and/or first CSI, and the second uplink control information includes second CSI. The physical uplink control channel resource includes N orthogonal frequency division multiplexing OFDM symbol sets, and each of the OFDM symbol sets includes one or more OFDM symbols. The first encoded bit sequence is carried in an OFDM symbol included in j OFDM symbol sets, the j OFDM symbol sets are a part of or all of the N orthogonal frequency division multiplexing OFDM symbol sets, N is a positive integer, and j is a positive integer less than or equal to N.

The OFDM symbol set in the embodiments of the present disclosure can be used to map, as much as possible, the first encoded bit sequence to an OFDM symbol close to an OFDM symbol carrying a DMRS, thereby improving reliability of the first uplink control information.

Optionally, N may be a positive integer greater than or equal to 2.

The first CSI may be the fore-mentioned type 1 CSI, and the second CSI may be the fore-mentioned type 2 CSI.

It should be noted that the OFDM symbol in the embodiments of the present disclosure may also be referred to as a time-domain symbol. The time-domain symbol may be an OFDM symbol, or may be a DFT-s-OFDM symbol. Certainly, the time-domain symbol may be another type of symbol. This is not limited in the embodiments of the present disclosure.

In addition, the physical uplink control channel resource in the embodiments of the present disclosure is in one slot (slot). In other words, all OFDM symbols included in the N OFDM symbol sets are in one slot. Herein, "one" is not limited to a particular slot, and may be anyone slot.

Optionally, j is less than N, a quantity of bits included in the first encoded bit sequence is less than a maximum quantity of bits that can be carried in all OFDM symbols included in the j OFDM symbol sets, and the first encoded bit sequence is carried only in the OFDM symbols included in the j OFDM symbol sets.

In this case, the first encoded bit sequence is always mapped to OFDM symbols that are in the OFDM symbol set and that are closest to an OFDM symbol carrying a DMRS, so that demodulation reliability of the first encoded bit sequence can be improved.

It should be noted that the first encoded bit sequence herein is carried only in the OFDM symbols included in the j OFDM symbol sets. This means that the first encoded bit sequence is carried in the OFDM symbols included in the j OFDM symbol sets, and the first encoded bit sequence is not carried in an OFDM symbol, in the OFDM symbols included in the physical uplink control channel resource, other than the OFDM symbol included in the j OFDM symbol sets.

Optionally, when j is equal to 1, the j OFDM symbol sets include a first OFDM symbol set, a part of or all of OFDM symbols included in the first OFDM symbol set carry a part of or all of bits in the second encoded bit sequence and a part of or all of bits in the first encoded bit sequence, and a difference between quantities of encoded bits in the first encoded bit sequence that are carried in any two of the part of or all of OFDM symbols is less than or equal to 1.

Because the difference between quantities of encoded bits in the first encoded bit sequence that are carried in any two of the part of or all of OFDM symbols is less than or equal to 1, the part of or all of bits in the first encoded bit sequence are distributed in the part of or all of OFDM symbols as evenly as possible. This even distribution manner can maximize a diversity gain of the first encoded bit sequence, to avoid burst interference caused by a specific OFDM symbol to the first encoded bit sequence.

Optionally, when j is equal to 2, the j OFDM symbol sets include a first OFDM symbol set and a second OFDM symbol set, the first encoded bit sequence includes a first encoded bit set and a second encoded bit set, OFDM symbols included in the first OFDM symbol set carries the first encoded bit set but does not carry the second encoded bit sequence, a part of or all of OFDM symbols included in the second OFDM symbol set carry the second encoded bit set and a part of or all of bits in the second encoded bit sequence, and a difference between quantities of encoded bits in the second encoded bit set that are carried in any two of the part of or all of OFDM symbols is less than or equal to 1.

Optionally, a quantity of encoded bits carried in an OFDM symbol included in the second OFDM symbol set is determined based on a priority of the OFDM symbol, and a quantity of bits in the first encoded bit sequence that are carried in a high-priority OFDM symbol is greater than or equal to a quantity of bits in the first encoded bit sequence that are carried in a low-priority OFDM symbol.

Optionally, when j is equal to 3, the j OFDM symbol sets include a first OFDM symbol set, a second OFDM symbol set, and a third OFDM symbol set, the first encoded bit sequence includes a first encoded bit set and a second encoded bit set, OFDM symbols included in the first OFDM symbol set and the second OFDM symbol set carry the first encoded bit set but do not carry the second encoded bit sequence, a part of or all of OFDM symbols included in the third OFDM symbol set carry the second encoded bit set and a part of or all of bits in the second encoded bit sequence, and a difference between quantities of encoded bits in the second encoded bit set that are carried in any two of the part of or all of OFDM symbols is less than or equal to 1.

Optionally, a quantity of encoded bits carried in an OFDM symbol included in the third OFDM symbol set is determined based on a priority of the OFDM symbol, and a quantity of bits in the first encoded bit sequence that are carried in a high-priority OFDM symbol is greater than or equal to a quantity of bits in the first encoded bit sequence that are carried in a low-priority OFDM symbol.

The quantity of bits in the first encoded bit sequence that are carried in the high-priority OFDM symbol is greater than or equal to the quantity of bits in the first encoded bit sequence that are carried in the low-priority OFDM symbol, so that the first encoded bit sequence can be mapped to two frequency hopping units of the physical uplink control channel as symmetrically as possible, to maximize a frequency diversity gain.

Optionally, the foregoing method further includes:
determining j based on the quantity of bits in the first encoded bit sequence, a maximum quantity of bits that can be carried in one OFDM symbol, and a quantity of symbols included in at least one OFDM symbol set, where when j is equal to 1, the j OFDM symbol sets include a first OFDM symbol set; or when j is equal to 2, the j OFDM symbol sets include a first OFDM symbol set and a second OFDM symbol set; or when j is equal to 3, the j OFDM symbol sets include a first OFDM symbol set, a second OFDM symbol set, and a third OFDM symbol set;

when j=1, determining a quantity of bits in the first encoded bit sequence that are carried in at least one OFDM symbol in the first OFDM symbol set based on the quantity of bits in the first encoded bit sequence and a quantity of OFDM symbols included in the first OFDM symbol set; or when j=2, determining a quantity of bits in the first encoded bit sequence that are carried in at least one OFDM symbol in the second OFDM symbol set based on the maximum quantity of bits that can be carried in one OFDM symbol, a quantity of bits in the first encoded bit sequence that are carried in all OFDM symbols in the first OFDM symbol set, and determining, based on the quantity of bits in the first encoded bit sequence, a quantity of OFDM symbols included in the first OFDM symbol set, the maximum quantity of bits that can be carried in one OFDM symbol, and a quantity of symbols included in the second OFDM symbol set; or when j=3, determining a quantity of bits in the first encoded bit sequence that are carried in all OFDM symbols in the first OFDM symbol set and the second OFDM symbol set based on the maximum quantity of bits that can be carried in one OFDM symbol, and determining a quantity of bits in the first encoded bit sequence that are carried in at least one OFDM symbol in the third OFDM symbol set based on the quantity of bits in the first encoded bit sequence, a quantity of OFDM symbols included in the first OFDM symbol set and the second OFDM symbol set, the maximum quantity of bits that can be carried in one OFDM symbol, and a quantity of symbols included in the third OFDM symbol set; and determining, based on a quantity of bits in the first encoded bit sequence that are carried in an OFDM symbol included in a $j^{th}$ OFDM symbol set, a quantity of bits in the second encoded bit sequence that are carried in a part of or all of OFDM symbols in the $j^{th}$ OFDM symbol set.

Optionally, the physical uplink control channel resource occupies OFDM symbol 0, OFDM symbol 1, OFDM symbol 2, and OFDM symbol 3, N=2, the OFDM symbol 1 is used to carry a demodulation reference signal DMRS, the N OFDM symbol sets include a first OFDM symbol set and a second OFDM symbol set, the first OFDM symbol set includes the OFDM symbol 0 and the OFDM symbol 2, and the second OFDM symbol set includes the OFDM symbol 3; or the physical uplink control channel resource occupies OFDM symbol 0, OFDM symbol 1, OFDM symbol 2, and OFDM symbol 3, N=1, the OFDM symbol 0 and the OFDM symbol 2 are used to carry a DMRS, the N OFDM symbol sets include a first OFDM symbol set, and the first OFDM symbol set includes the OFDM symbol 1 and the OFDM symbol 3; or the physical uplink control channel resource occupies OFDM symbol 0, OFDM symbol 1, OFDM symbol 2, OFDM symbol 3, and OFDM symbol 4, N=1, the OFDM symbol 0 and the OFDM symbol 3 are used to carry a DMRS, the N OFDM symbol sets include a first OFDM symbol set, and the first OFDM symbol set includes the OFDM symbol 1, the OFDM symbol 2, and the OFDM symbol 4; or the physical uplink control channel resource occupies OFDM symbol 0, OFDM symbol 1, OFDM symbol 2, OFDM symbol 3, OFDM symbol 4, and OFDM symbol 5, N=1, the OFDM symbol 1 and the OFDM symbol 4 are used to carry a DMRS, the N OFDM symbol sets include a first OFDM symbol set, and the first OFDM symbol set includes the OFDM symbol 0, the OFDM symbol 2, the OFDM symbol 3, and the OFDM symbol 5; or the physical uplink control channel resource occupies OFDM symbol 0, OFDM symbol 1, OFDM symbol 2, OFDM symbol 3, OFDM symbol 4, OFDM symbol 5, and OFDM symbol 6, N=2, the OFDM symbol 1 and the OFDM symbol 4 are used to carry a DMRS, the N OFDM symbol sets include a first OFDM symbol set and a second OFDM symbol set, the first OFDM symbol set includes the OFDM symbol 0, the OFDM symbol 2, the OFDM symbol 3, and the OFDM symbol 5, and the second OFDM symbol set includes the OFDM symbol 6; or the physical uplink control channel resource occupies OFDM symbol 0, OFDM symbol 1, OFDM symbol 2, OFDM symbol 3, OFDM symbol 4, OFDM symbol 5, OFDM symbol 6, and OFDM symbol 7, N=2, the OFDM symbol 1 and the OFDM symbol 5 are used to carry a DMRS, the N OFDM symbol sets include a first OFDM symbol set and a second OFDM symbol set, the first OFDM symbol set includes the OFDM symbol 0, the OFDM symbol 2, the OFDM symbol 4, and the OFDM symbol 6, and the second OFDM symbol set includes the OFDM symbol 3 and the OFDM symbol 7; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, and OFDM symbol 8, N=2, the OFDM symbol 1 and the OFDM symbol 6 are used to carry a demodulation reference signal DMRS, the N OFDM symbol sets include a first OFDM symbol set and a second OFDM symbol set, the first OFDM symbol set includes the OFDM symbol 0, the OFDM symbol 2, the OFDM symbol 5, and the OFDM symbol 7, and the second OFDM symbol set includes the OFDM symbol 3, the OFDM symbol 4, and the OFDM symbol 8; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, and OFDM symbol 9, N=2, the OFDM symbol 2 and the OFDM symbol 7 are used to carry a DMRS, the N OFDM symbol sets include a first OFDM symbol set and a second OFDM symbol set, the first OFDM symbol set includes the OFDM symbol 1, the OFDM symbol 3, the OFDM symbol 6, and the OFDM symbol 8, and the second OFDM symbol set includes the OFDM symbol 0, the OFDM symbol 4, the OFDM symbol 5, and the OFDM symbol 9; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, and OFDM symbol 9, N=1, the OFDM symbol 1, the OFDM symbol 3, the OFDM symbol 6, and the OFDM symbol 8 are used to carry a demodulation reference signal DMRS, the N OFDM symbol sets include a first OFDM symbol set, and the first OFDM symbol set includes the OFDM symbol 0, the OFDM symbol 2, the OFDM symbol 4, the OFDM symbol 5, the OFDM symbol 7, and the OFDM symbol 9; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, and OFDM symbol 10, N=3, the OFDM symbol 2 and the OFDM symbol 7 are used to carry a DMRS, the N OFDM symbol sets include a first OFDM symbol set, a second OFDM symbol set, and a third OFDM symbol set, the first OFDM symbol set includes the OFDM symbol 1, the OFDM symbol 3, the OFDM symbol 6, and the OFDM symbol 8, the second OFDM symbol set includes the OFDM symbol 0, the OFDM symbol 4, the OFDM symbol 5, and the OFDM symbol 9, and the third OFDM symbol set includes the OFDM symbol 10; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, and OFDM symbol 10, N=1, the OFDM symbol 1, the OFDM symbol 3, the OFDM symbol 6, and the OFDM symbol 9 are used to carry a DMRS, the N OFDM symbol sets include a first OFDM symbol set, and the first OFDM symbol set includes the OFDM symbol 0, the OFDM symbol 2, the OFDM symbol 4, the OFDM symbol 5, the OFDM symbol 7, the OFDM symbol 8, and the OFDM symbol 10; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, and OFDM symbol 11, N=3, the OFDM symbol 2 and the OFDM symbol 8 are used to carry a DMRS, the N OFDM symbol sets include a first OFDM symbol set, a second OFDM symbol set, and a third OFDM symbol set, the first OFDM symbol set includes the OFDM symbol 1, the OFDM symbol 3, the OFDM symbol 7, and the OFDM symbol 9, the second OFDM symbol set includes the OFDM symbol 0, the OFDM symbol 4, the OFDM symbol 6, and the OFDM symbol 10, and the third OFDM symbol set includes the OFDM symbol 5 and the OFDM symbol 11; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, and OFDM symbol 11, N=1, the OFDM symbol 1, the OFDM symbol 4, the OFDM symbol 7, and the OFDM symbol 10 are used to carry a DMRS, the N OFDM symbol sets include a first OFDM symbol set, and the first OFDM symbol set includes the OFDM symbol 0, the OFDM symbol 2, the OFDM symbol 3, the OFDM symbol 5, the OFDM symbol 6, the OFDM symbol 8, the OFDM symbol 9, and the OFDM symbol 11; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=3, the OFDM symbol 2 and the OFDM symbol 9 are used to carry a DMRS, the N OFDM symbol sets include a first OFDM symbol set, a second OFDM symbol set, and a third OFDM symbol set, the first OFDM symbol set includes the OFDM symbol 1, the OFDM symbol 3, the OFDM symbol 8, and the OFDM symbol 10, the second OFDM symbol set includes the OFDM symbol 0, the OFDM symbol 4, the OFDM symbol 7, and the OFDM symbol 11, and the third OFDM symbol set includes the OFDM symbol 5, the OFDM symbol 6, and the OFDM symbol 12; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=2, the OFDM symbol 1, the OFDM symbol 4, the OFDM symbol 7, and the OFDM symbol 11 are used to carry a DMRS, the N OFDM symbol sets include a first OFDM symbol set, and a second OFDM symbol set, the first OFDM symbol set includes the OFDM symbol 0, the OFDM symbol 2, the OFDM symbol 3, the OFDM symbol 5, the OFDM symbol 6, the OFDM symbol 8, the OFDM symbol 10, and the OFDM symbol 12, and the second OFDM symbol set includes the OFDM symbol 9; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=3, the OFDM symbol 3 and the OFDM symbol 10 are used to carry a DMRS, the N OFDM symbol sets include a first OFDM symbol set, a second OFDM symbol set, and a third OFDM symbol set, the first OFDM symbol set includes the OFDM symbol 2, the OFDM symbol 4, the OFDM symbol 9, and the OFDM symbol 11, the second OFDM symbol set includes the OFDM symbol 1, the OFDM symbol 5, the OFDM symbol 8, and the OFDM symbol 12, and the third OFDM symbol set includes the OFDM symbol 0, the OFDM symbol 6, the OFDM symbol 7, and the OFDM symbol 13; or the physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=2, the OFDM symbol 1, the OFDM symbol 5, the OFDM symbol 8, and the OFDM symbol 12 are used to carry a DMRS, the N OFDM symbol sets include a first OFDM symbol set, and a second OFDM symbol set, the first OFDM symbol set includes the OFDM symbol 0, the OFDM symbol 2, the OFDM symbol 4, the OFDM symbol 6, the OFDM symbol 7, the OFDM symbol 9, the OFDM symbol 11, and the OFDM symbol 13, and the second OFDM symbol set includes the OFDM symbol 3 and the OFDM symbol 10.

OFDM symbols in different OFDM symbol sets have different intervals with an OFDM symbol carrying a DMRS, and OFDM symbols in one OFDM symbol set have a same interval with an OFDM symbol carrying a DMRS. The OFDM symbol set can be defined to map, as much as possible, the first encoded bit sequence to OFDM symbols close to an OFDM symbol carrying a DMRS.

According to a fifth aspect, a communication apparatus is provided. The communication apparatus is configured to perform the foregoing method. Functions of the communications apparatus may be implemented by hardware, or may be implemented by hardware executing corresponding software. The hardware or the software includes one or more units corresponding to the functions.

According to a sixth aspect, a computer storage medium that includes an instruction is provided. When the computer storage medium is run on a computer, the computer performs the foregoing method.

According to a seventh aspect, a computer program product that includes an instruction is provided. When the computer program product is run on a computer, the computer performs the method in the foregoing aspects.

DESCRIPTION OF EMBODIMENTS

The following describes the technical solutions in the embodiments of the present disclosure with reference to the accompanying drawings in the embodiments of the present disclosure. It should be noted that the technical solutions or features in the embodiments of the present disclosure may be mutually combined when no conflict occurs.

In the embodiments of the present disclosure, "a/an" means an individual, but this does not indicate that "a/an"

can only be an individual and cannot be applied to another individual. For example, in the embodiments of the present disclosure, "a terminal device" is described for a terminal device, but this does not mean that "a terminal device" can be applied only to a particular terminal device. The terms "system" and "network" may be interchangeably used in this application.

In this application, use of "an embodiment" (or "an implementation") or "embodiments" (or "implementations") means that a particular characteristic, structure, feature, and the like that are described in combination with an embodiment are included in at least one embodiment. Therefore, "in an embodiment" or "in the embodiments" that appears throughout this specification does not represent a same embodiment.

Further, in the embodiments of the present disclosure, the terms "and/or" and "at least one" used in cases of "A and/or B" and "at least one of A and B" include any one of three solutions: a solution in which A is included but B is excluded, a solution in which B is included but A is excluded, and a solution in which both options A and B are included. For another example, such phrases in cases of "A, B, and/or C" and "at least one of A, B, and/or C" include any one of seven solutions: a solution in which A is included but B and C are excluded, a solution in which B is included but A and C are excluded, a solution in which C is included but A and B are excluded, a solution in which A and B are included but C is excluded, a solution in which B and C are included but A is excluded, a solution in which A and C are included but B is excluded, and a solution in which all the three options A, B, and C are included. As easily understood by a person of ordinary skill in the art and a related art, all other similar descriptions can be understood in the foregoing manner in the embodiments of the present disclosure.

Figure 1:
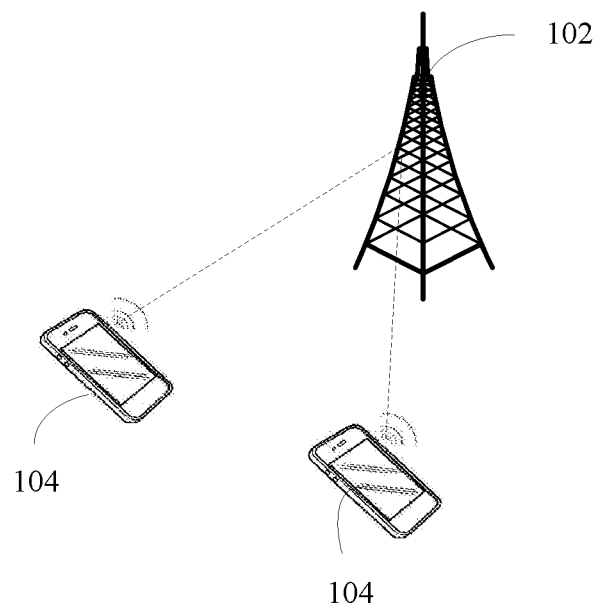
FIG. 1 is a schematic diagram of a wireless communication system applied to an embodiment of the present disclosure.

FIG. 1 is a schematic communication diagram of a wireless communication system. The wireless communication system may include systems using various radio access technologies (RAT), for example, a Code Division Multiple Access (CDMA) system, a Time Division Multiple Access (TDMA) system, a Frequency Division Multiple Access (FDMA) system, an orthogonal frequency division multiple access (OFDMA) system, and a single carrier frequency division multiple access (SC-FDMA) system. For example, the wireless communication system may be a Long Term Evolution (LTE) system, a CDMA system, a Wideband Code Division Multiple Access (WCDMA) system, a Global System for Mobile Communications (GSM) system, a wireless local area network (WLAN) system, a New Radio (NR) system, various evolved or convergent systems, and a system oriented to a future communication technology. A system architecture and a service scenario that are described in the embodiments of the present disclosure are intended to more clearly describe the technical solutions in the embodiments of the present disclosure, and constitute no limitation on the technical solutions provided in the embodiments of the present disclosure. A person of ordinary skill in the art may know that as the network architecture evolves and a new service scenario emerges, the technical solutions provided in the embodiments of the present disclosure are also applicable to a similar technical problem.

For brevity, FIG. 1 shows communication between one network device (for example, access network device) 102 and two wireless devices (for example, terminal devices) 104. Generally, the wireless communication system may include any quantity of network devices and terminal devices. The wireless communication system may further include one or more core network devices, a device configured to carry a virtualized network function, or the like. The access network device 102 may provide services for the wireless devices by using one or more carriers. In this application, both the access network device and the terminal device are referred to as a communication apparatus.

In this application, the access network device 102 is an apparatus deployed in a radio access network to provide a wireless communication function for the terminal devices. The access network device may include a macro base station (BS), a micro base station (also referred to as a small cell), a relay node, an access point, or the like that is in various forms. A device with a radio access function may have different names in systems using different radio access technologies. For example, the device having the radio access function is referred to as an evolved NodeB (evolved NodeB, eNB or eNodeB) in an LTE system, and is referred to as a NodeB (NodeB) in a 3rd Generation (3rd generation, 3G) system. For ease of description, in this application, the device having the radio access function is briefly referred to as an access network device, and is also referred to as a base station sometimes.

The wireless device in the embodiments of the present disclosure may include various handheld devices, in-vehicle devices, wearable devices, or computing devices that have a wireless communication function, or another processing device connected to a wireless modem. The wireless device may be referred to as the terminal device, or may be referred to as a mobile station (mobile station, MS), a terminal, user equipment (UE), or the like. The wireless device may include a subscriber unit, a cellular phone, a smartphone, a wireless data card, a personal digital assistant (PDA) computer, a tablet computer, a modem or a modem processor, a handheld device, a laptop computer, a netbook, a cordless phone or a wireless local loop (WLL) station, a Bluetooth device, a machine type communication (MTC) terminal, and the like. For ease of description, in this application, the wireless device is briefly referred to as a terminal device or UE.

The wireless device can support one or more wireless technologies for wireless communication, such as 5Gc LTE, WCDMA, CDMA, 1×, Time Division-Synchronous Code Division Multiple Access (TD-SCDMA), GSM, and 802.11. The wireless device can also support a carrier aggregation technology.

A plurality of wireless devices may perform a same service or different services, for example, a mobile broadband service, an Enhanced Mobile Broadband (eMBB) service, or an ultra-reliable and low latency communication (URLLC) service for a terminal device.

Figure 2:
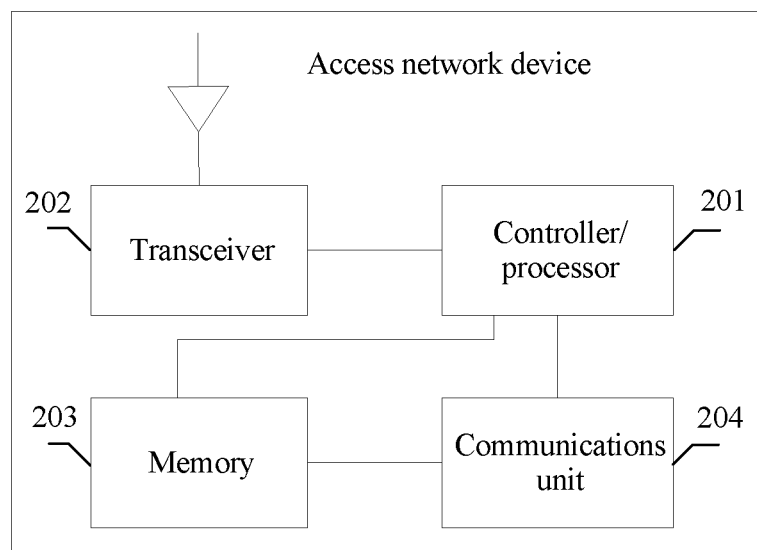
FIG. 2 is a possible schematic structural diagram of an access network device in the foregoing wireless communication system.

Further, a possible schematic structural diagram of the access network device 102 may be shown in FIG. 2. The access network device 102 can perform a method provided in the embodiments of the present disclosure. The access network device 102 may include a controller or processor 201 (the processor 201 is used as an example below for description) and a transceiver 202. The controller/processor 201 is also referred to as a modem processor sometimes. The modem processor 201 may include a baseband processor (baseband processor, BBP) (not shown). The baseband processor processes a digitized received signal, to extract an information or data bit conveyed in the signal. In this way, as required or as expected, the BBP is usually implemented in one or more digital signal processors (DSP) in the modem processor 201, or is implemented as separate integrated circuits (IC).

The transceiver 202 may be configured to: support to receive or send information between the access network device 102 and the terminal devices, and support radio communication between the terminal devices. The processor 201 may be further configured to perform various functions of communication between the terminal device and other network devices. In an uplink, an uplink signal from the terminal device is received by using an antenna, demodulated by the transceiver 202, and further processed by the processor 201, to retrieve service data and/or signaling information that are/is sent by the terminal device. In a downlink, service data and/or a signaling message are/is processed by the processor 201 and modulated by the transceiver 202, to generate a downlink signal, and the downlink signal is transmitted to the terminal device by using the antenna. The access network device 102 may further include a memory 203 that may be configured to store program code and/or data of the access network device 102. The transceiver 202 may include an independent receiving circuit and an independent transmitting circuit, or may include one circuit for implementing sending and receiving functions. The access network device 102 may further include a communication unit 204 configured to support communication between the access network device 102 and another network entity. For example, the communication unit 204 is configured to support communication between the access network device 102 and a network device in a core network.

Optionally, the access network device may further include a bus. The transceiver 202, the memory 203, and the communication unit 204 may be connected to the processor 201 by using the bus. For example, the bus may be a peripheral component interconnect (PCI) bus, or an extended industry standard architecture (EISA) bus. The bus may include an address bus, a data bus, a control bus, and the like.

Figure 3:
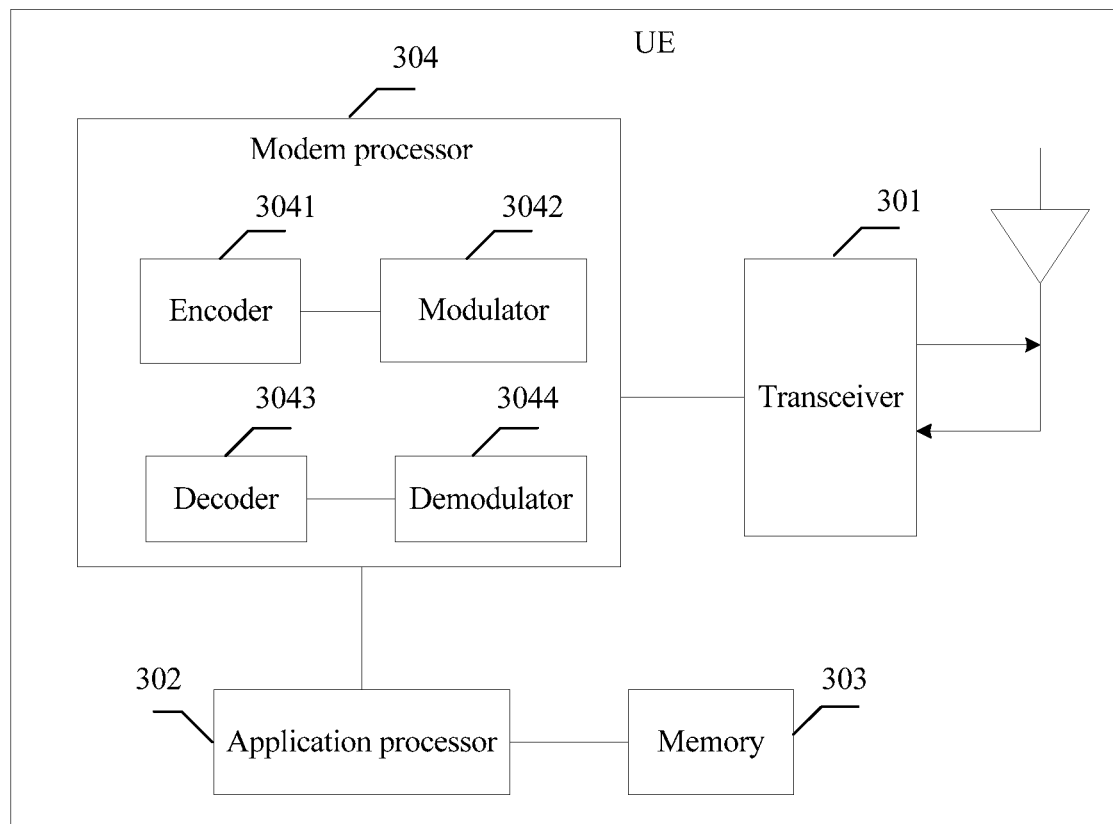
FIG. 3 is a possible schematic structural diagram of a terminal device in the foregoing wireless communication system.

FIG. 3 is a possible schematic structural diagram of the terminal device in the foregoing wireless communication system. The terminal device can perform the method provided in the embodiments of the present disclosure. The terminal device may be either of the two terminal devices 104. The terminal device includes a transceiver 301, an application processor 302, a memory 303, and a modem processor 304.

The transceiver 301 may adjust (for example, perform analog conversion, filtering, amplification, or up-conversion on) output samples, and generate an uplink signal. The uplink signal is transmitted to the access network device in the foregoing embodiment by using an antenna. In a downlink, the antenna receives a downlink signal transmitted by the access network device. The transceiver 301 may adjust (for example, perform filtering, amplification, down-conversion, or digitization on) the signal received from the antenna, and provide input samples.

The modem processor 304 is also referred to as a controller or a processor sometimes, and may include a baseband processor (BBP) (not shown). The baseband processor processes a digitized received signal, to extract an information or data bit conveyed in the signal. As required or as expected, the BBP is usually implemented in one or more digital signal processors in the modem processor 304, or is implemented as separate integrated circuits (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent in an uplink, and process (for example, format, encode, or interleave) the service data and the signaling message. The modulator 3042 is configured to modulate an output signal of the encoder 3041. For example, the modulator may perform processing such as symbol mapping and/or modulation on the output signal (data and/or signaling) of the encoder, and provide output samples. The demodulator 3044 is configured to perform demodulation processing on an input signal. For example, the demodulator 3044 processes input samples and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the composite modem processor 304. These units perform processing based on a radio access technology used in a radio access network.

The modem processor 304 receives, from the application processor 302, digitized data that may represent a voice, data, or control information, and processes the digitized data for transmission. The modem processor can support one or more of a plurality of wireless communication protocols in a plurality of communication systems, such as LTE, New Radio, Universal Mobile Telecommunications System (UMTS), and High Speed Packet Access (HSPA). Optionally, the modem processor 304 may further include one or more memories.

Optionally, the modem processor 304 and the application processor 302 may be integrated into one processor chip.

The memory 303 is configured to store program code (also referred to as a program, an instruction, software, or the like sometimes) and/or data that are/is used to support communication of the terminal device.

It should be noted that the memory 203 or the memory 303 may include one or more storage units. For example, the storage unit may be an internal storage unit of the processor 201, the modem processor 304, or the application processor 302 for storing program code, or may be an external storage unit independent of the processor 201, the modem processor 304, or the application processor 302, or may be an internal storage unit of the processor 201, the modem processor 304, or the application processor 302 and an external storage unit independent of the processor 201, the modem processor 304, or the application processor 302.

The processor 201 and the modem processor 304 may be processors of a same type, or may be processors of different types. For example, the processor 201 and the modem processor 304 may be implemented in a central processing unit (CPU), a general processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 304 may implement or execute various example logic blocks, modules, and circuits described with reference to the content disclosed in the embodiments of the present disclosure. Alternatively, the processor may be a system-on-a-chip (SOC) implementing a computing function.

A person skilled in the art can understand that with reference to the various aspects disclosed in this application, various explanatory logical blocks, modules, circuits, and algorithms including a combination of one ore more microprocessors, a combination of DSP and a microprocessor, or a system-on-a chip may be implemented as electronic hardware, an instruction that is stored in a memory or another computer readable medium and that is executed by a processor or another processing device, or a combination thereof. For example, the device described in this specification can be used in any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on specific applications, design selection, and/or design constraints imposed on an entire system. A person skilled in the art may use different manners to implement the described functionality for each particular application, but it should not be considered that such implementation goes beyond the scope of the present disclosure.

As described above, when the HARQ-ACK, the type 1 CSI, and the type 2 CSI are simultaneously transmitted, the HARQ-ACK and the type 1 CSI are jointly encoded, and the type 2 CSI is independently encoded. In this specification, a bit sequence obtained by jointly encoding the HARQ-ACK and the type 1 CSI may be referred to as a first encoded bit sequence, and a bit sequence obtained by independently encoding the type 2 CSI may be referred to as a second encoded bit sequence.

Based on a conclusion in the RAN1#91 meeting, when both the two encoded bit sequences are sent by using a physical uplink control channel format 3 or a physical uplink control channel format 4, the following rules need to be followed in a process of determining an OFDM symbol used to carry the first encoded bit sequence.

1. A physical uplink control channel includes one or more OFDM symbols used to carry a DMRS, and quantities of OFDM symbols that are used to carry the first encoded bit sequence and that are around the OFDM symbols used to carry a DMRS are as equal as possible.
2. If not all bits that can be carried in some OFDM symbols are occupied by the first encoded bit sequence, quantities of bits in the first encoded bit sequence that are carried in these OFDM symbols are as equal as possible.
3. OFDM symbols that are fully used to carry the first encoded bit sequence are as many as possible.

However, currently, there is still no method in which the two encoded bit sequences can be mapped to the physical uplink control channel according to the foregoing rules.

To send the physical uplink control channel format 3 or 4 when the foregoing rules are met, in the embodiments of the present disclosure, OFDM symbols in a slot carrying the physical uplink control channel are grouped into N sets, where N is a positive integer, and 1≤N≤3.

The OFDM symbol set in the embodiments of the present disclosure may be shown in Table 1.

TABLE 1

Relationship between an OFDM symbol set and a quantity of OFDM symbols occupied by a PUCCH

| Quantity of OFDM symbols occupied by a PUCCH | Index of an OFDM symbol carrying a DMRS | Quantity of OFDM symbol sets | First OFDM symbol set | Second OFDM symbol set | Third OFDM symbol set |
|---|---|---|---|---|---|
| 4 | {1} | 2 | {0, 2} | {3} | — |
| 4 | {0, 2} | 1 | {1, 3} | — | — |
| 5 | {0, 3} | 1 | {1, 2, 4} | — | — |
| 6 | {1, 4} | 1 | {0, 2, 3, 5} | — | — |
| 7 | {1, 4} | 2 | {0, 2, 3, 5} | {6} | — |
| 8 | {1, 5} | 2 | {0, 2, 4, 6} | {3, 7} | — |
| 9 | {1, 6} | 2 | {0, 2, 5, 7} | {3, 4, 8} | — |
| 10 | {2, 7} | 2 | {1, 3, 6, 8} | {0, 4, 5, 9} | — |
| 10 | {1, 3, 6, 8} | 1 | {0, 2, 4, 5, 7, 9} | — | — |
| 11 | {2, 7} | 3 | {1, 3, 6, 8} | {0, 4, 5, 9} | {10} |
| 11 | {1, 3, 6, 9} | 1 | {0, 2, 4, 5, 7, 8, 10} | — | — |
| 12 | {2, 8} | 3 | {1, 3, 7, 9} | {0, 4, 6, 10} | {5, 11} |
| 12 | {1, 4, 7, 10} | 1 | {0, 2, 3, 5, 6, 8, 9, 11} | — | — |
| 13 | {2, 9} | 3 | {1, 3, 8, 10} | {0, 4, 7, 11} | {5, 6, 12} |
| 13 | {1, 4, 7, 11} | 2 | {0, 2, 3, 5, 6, 8, 10, 12} | {9} | — |
| 14 | {3, 10} | 3 | {2, 4, 9, 11} | {1, 5, 8, 12} | {0, 6, 7, 13} |
| 14 | {1, 5, 8, 12} | 2 | {0, 2, 4, 6, 7, 9, 11, 13} | {3, 10} | — |

In the foregoing table, when the PUCCH occupies four OFDM symbols, and an index of an OFDM symbol carrying a demodulation reference signal (DMRS) is 1, N=2, a first OFDM symbol set has OFDM symbol 0 and OFDM symbol 2, and a second OFDM symbol set has OFDM symbol 3. When the PUCCH occupies four OFDM symbols, and indexes of OFDM symbols carrying a DMRS are 0 and 2, N=1, and a first OFDM symbol set has OFDM symbol 1 and OFDM symbol 3. A quantity of OFDM symbol sets and an OFDM symbol included in each set in another case are similar. Details are not described in this specification.

Further, in the embodiments of the present disclosure, an OFDM symbol set carrying UCI can be determined based on the quantity of OFDM symbols occupied by the PUCCH, and a quantity of OFDM symbols carrying a DMRS and/or the index of the OFDM symbol carrying a DMRS.

Specifically, when a PUCCH resource occupies OFDM symbol 0, OFDM symbol 1, OFDM symbol 2, and OFDM symbol 3, in other words, the PUCCH resource occupies four OFDM symbols, and the OFDM symbol 1 is used to carry a demodulation reference signal DMRS, N=2, the N OFDM symbol sets include a first OFDM symbol set and a second OFDM symbol set, the first OFDM symbol set includes the OFDM symbol 0 and the OFDM symbol 2, and the second OFDM symbol set includes the OFDM symbol 3.

When a physical uplink control channel resource occupies OFDM symbol 0, OFDM symbol 1, OFDM symbol 2, and OFDM symbol 3, in other words, the PUCCH resource occupies four OFDM symbols, and the OFDM symbol 0 and the OFDM symbol 2 are used to carry a DMRS, N=1, the N OFDM symbol sets include a first OFDM symbol set, and the first OFDM symbol set includes the OFDM symbol 1 and the OFDM symbol 3.

When a physical uplink control channel resource occupies OFDM symbol 0, OFDM symbol 1, OFDM symbol 2, OFDM symbol 3, and OFDM symbol 4, in other words, the PUCCH resource occupies the five OFDM symbols, and the OFDM symbol 0 and the OFDM symbol 3 are used to carry a DMRS, N=1, the N OFDM symbol sets include a first OFDM symbol set, and the first OFDM symbol set includes the OFDM symbol 1, the OFDM symbol 2, and the OFDM symbol 4.

When a physical uplink control channel resource occupies OFDM symbol 0, OFDM symbol 1, OFDM symbol 2, OFDM symbol 3, OFDM symbol 4, and OFDM symbol 5, in other words, the PUCCH resource occupies six OFDM symbols, and the OFDM symbol 1 and the OFDM symbol 4 are used to carry a DMRS, N=1, the N OFDM symbol sets include a first OFDM symbol set, and the first OFDM symbol set includes the OFDM symbol 0, the OFDM symbol 2, the OFDM symbol 3, and the OFDM symbol 5.

When a physical uplink control channel resource occupies OFDM symbol 0, OFDM symbol 1, OFDM symbol 2, OFDM symbol 3, OFDM symbol 4, OFDM symbol 5, and OFDM symbol 6, in other words, the PUCCH resource occupies seven OFDM symbols, and the OFDM symbol 1 and the OFDM symbol 4 are used to carry a DMRS, N=2, the N OFDM symbol sets include a first OFDM symbol set and a second OFDM symbol set, the first OFDM symbol set includes the OFDM symbol 0, the OFDM symbol 2, the OFDM symbol 3, and the OFDM symbol 5, and the second OFDM symbol set includes the OFDM symbol 6.

When a physical uplink control channel resource occupies OFDM symbol 0, OFDM symbol 1, OFDM symbol 2, OFDM symbol 3, OFDM symbol 4, OFDM symbol 5, OFDM symbol 6, and OFDM symbol 7, in other words, the PUCCH resource occupies eight OFDM symbols, and the OFDM symbol 1 and the OFDM symbol 5 are used to carry a DMRS, N=2, the N OFDM symbol sets include a first OFDM symbol set and a second OFDM symbol set, the first OFDM symbol set includes the OFDM symbol 0, the OFDM symbol 2, the OFDM symbol 4, and the OFDM symbol 6, and the second OFDM symbol set includes the OFDM symbol 3 and the OFDM symbol 7.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, and OFDM symbol 8, in other words, the PUCCH resource occupies nine OFDM symbols, and the OFDM symbol 1 and the OFDM symbol 6 are used to carry a DMRS, N=2, the N OFDM symbol sets include a first OFDM symbol set and a second OFDM symbol set, the first OFDM symbol set includes the OFDM symbol 0, the OFDM symbol 2, the OFDM symbol 5, and the OFDM symbol 7, and the second OFDM symbol set includes the OFDM symbol 3, the OFDM symbol 4, and the OFDM symbol 8.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, and OFDM symbol 9, in other words, the PUCCH resource occupies ten OFDM symbols, and the OFDM symbol 2 and the OFDM symbol 7 are used to carry a DMRS, N=2, the N OFDM symbol sets include a first OFDM symbol set and a second OFDM symbol set, the first OFDM symbol set includes the OFDM symbol 1, the OFDM symbol 3, the OFDM symbol 6, and the OFDM symbol 8, and the second OFDM symbol set includes the OFDM symbol 0, the OFDM symbol 4, the OFDM symbol 5, and the OFDM symbol 9.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, and OFDM symbol 9, in other words, the PUCCH resource occupies ten OFDM symbols, and the OFDM symbol 1, the OFDM symbol 3, the OFDM symbol 6, and the OFDM symbol 8 are used to carry a demodulation reference signal DMRS, N=1, the N OFDM symbol sets include a first OFDM symbol set, and the first OFDM symbol set includes the OFDM symbol 0, the OFDM symbol 2, the OFDM symbol 4, the OFDM symbol 5, the OFDM symbol 7, and the OFDM symbol 9.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, and OFDM symbol 10, in other words, the PUCCH resource occupies eleven OFDM symbols, and the OFDM symbol 2 and the OFDM symbol 7 are used to carry a DMRS, N=3, the N OFDM symbol sets include a first OFDM symbol set, a second OFDM symbol set, and a third OFDM symbol set, the first OFDM symbol set includes the OFDM symbol 1, the OFDM symbol 3, the OFDM symbol 6, and the OFDM symbol 8, the second OFDM symbol set includes the OFDM symbol 0, the OFDM symbol 4, the OFDM symbol 5, and the OFDM symbol 9, and the third OFDM symbol set includes the OFDM symbol 10.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, and OFDM symbol 10, in other words, the PUCCH resource occupies eleven OFDM symbols, and the OFDM symbol 1, the OFDM symbol 3, the OFDM symbol 6, and the OFDM symbol 9 are used to carry a DMRS, N=1, the N OFDM symbol sets include a first OFDM symbol set, and the first OFDM symbol set includes the OFDM symbol 0, the OFDM symbol 2, the OFDM symbol 4, the OFDM symbol 5, the OFDM symbol 7, the OFDM symbol 8, and the OFDM symbol 10.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, and OFDM symbol 11, in other words, the PUCCH resource occupies twelve OFDM symbols, and the OFDM symbol 2 and the OFDM symbol 8 are used to carry a DMRS, N=3, the N OFDM symbol sets include a first OFDM symbol set, a second OFDM symbol set, and a third OFDM symbol set, the first OFDM symbol set includes the OFDM symbol 1, the OFDM symbol 3, the OFDM symbol 7, and the OFDM symbol 9, the second OFDM symbol set includes the OFDM symbol 0, the OFDM symbol 4, the OFDM symbol 6, and the OFDM symbol 10, and the third OFDM symbol set includes the OFDM symbol 5 and the OFDM symbol 11.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, and OFDM symbol 11, in other words, the PUCCH resource occupies twelve OFDM symbols, and the OFDM symbol 1, the OFDM symbol 4, the OFDM symbol 7, and the OFDM symbol 10 are used to carry a DMRS, N=1, the N OFDM symbol sets include a first OFDM symbol set, and the first OFDM symbol set includes the OFDM symbol 0, the OFDM symbol 2, the OFDM symbol 3, the OFDM symbol 5, the OFDM symbol 6, the OFDM symbol 8, the OFDM symbol 9, and the OFDM symbol 11.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, in other words, the PUCCH resource occupies thirteen OFDM symbols, and the OFDM symbol 2 and the OFDM symbol 9 are used to carry a DMRS, N=3, the N OFDM symbol sets include a first OFDM symbol set, a second OFDM symbol set, and a third OFDM symbol set, the first OFDM symbol set includes the OFDM symbol 1, the OFDM symbol 3, the OFDM symbol 8, and the OFDM symbol 10, the second OFDM symbol set includes the OFDM symbol 0, the OFDM symbol 4, the OFDM symbol 7, and the OFDM symbol 11, and the third OFDM symbol set includes the OFDM symbol 5, the OFDM symbol 6, and the OFDM symbol 12.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, in other words, the PUCCH resource occupies thirteen OFDM symbols, and the OFDM symbol 1, the OFDM symbol 4, the OFDM symbol 7, and the OFDM symbol 11 are used to carry a DMRS, N=2, the N OFDM symbol sets include a first OFDM symbol set, and a second OFDM symbol set, the first OFDM symbol set includes the OFDM symbol 0, the OFDM symbol 2, the OFDM symbol 3, the OFDM symbol 5, the OFDM symbol 6, the OFDM symbol 8, the OFDM symbol 10, and the OFDM symbol 12, and the second OFDM symbol set includes the OFDM symbol 9.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, in other words, the PUCCH resource occupies fourteen OFDM symbols, and the OFDM symbol 3 and the OFDM symbol 10 are used to carry a DMRS, N=3, the N OFDM symbol sets include a first OFDM symbol set, a second OFDM symbol set, and a third OFDM symbol set, the first OFDM symbol set includes the OFDM symbol 2, the OFDM symbol 4, the OFDM symbol 9, and the OFDM symbol 11, the second OFDM symbol set includes the OFDM symbol 1, the OFDM symbol 5, the OFDM symbol 8, and the OFDM symbol 12, and the third OFDM symbol set includes the OFDM symbol 0, the OFDM symbol 6, the OFDM symbol 7, and the OFDM symbol 13.

When a physical uplink control channel resource occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, in other words, the PUCCH resource occupies fourteen OFDM symbols, and the OFDM symbol 1, the OFDM symbol 5, the OFDM symbol 8, and the OFDM symbol 12 are used to carry a DMRS, N=2, the N OFDM symbol sets include a first OFDM symbol set, and a second OFDM symbol set, the first OFDM symbol set includes the OFDM symbol 0, the OFDM symbol 2, the OFDM symbol 4, the OFDM symbol 6, the OFDM symbol 7, the OFDM symbol 9, the OFDM symbol 11, and the OFDM symbol 13, and the second OFDM symbol set includes the OFDM symbol 3 and the OFDM symbol 10.

OFDM symbols in different OFDM symbol sets have different intervals with an OFDM symbol carrying a DMRS, and OFDM symbols in one OFDM symbol set have a same interval with an OFDM symbol carrying a DMRS. The OFDM symbol set in the embodiments of the present disclosure can be used to map, as much as possible, the first encoded bit sequence to OFDM symbols close to an OFDM symbol carrying a DMRS.

How to map a first encoded bit sequence in the PUCCH format 3 or PUCCH format 4 in an embodiment of the present disclosure is further provided below with reference to the foregoing embodiments.

Figure 4:
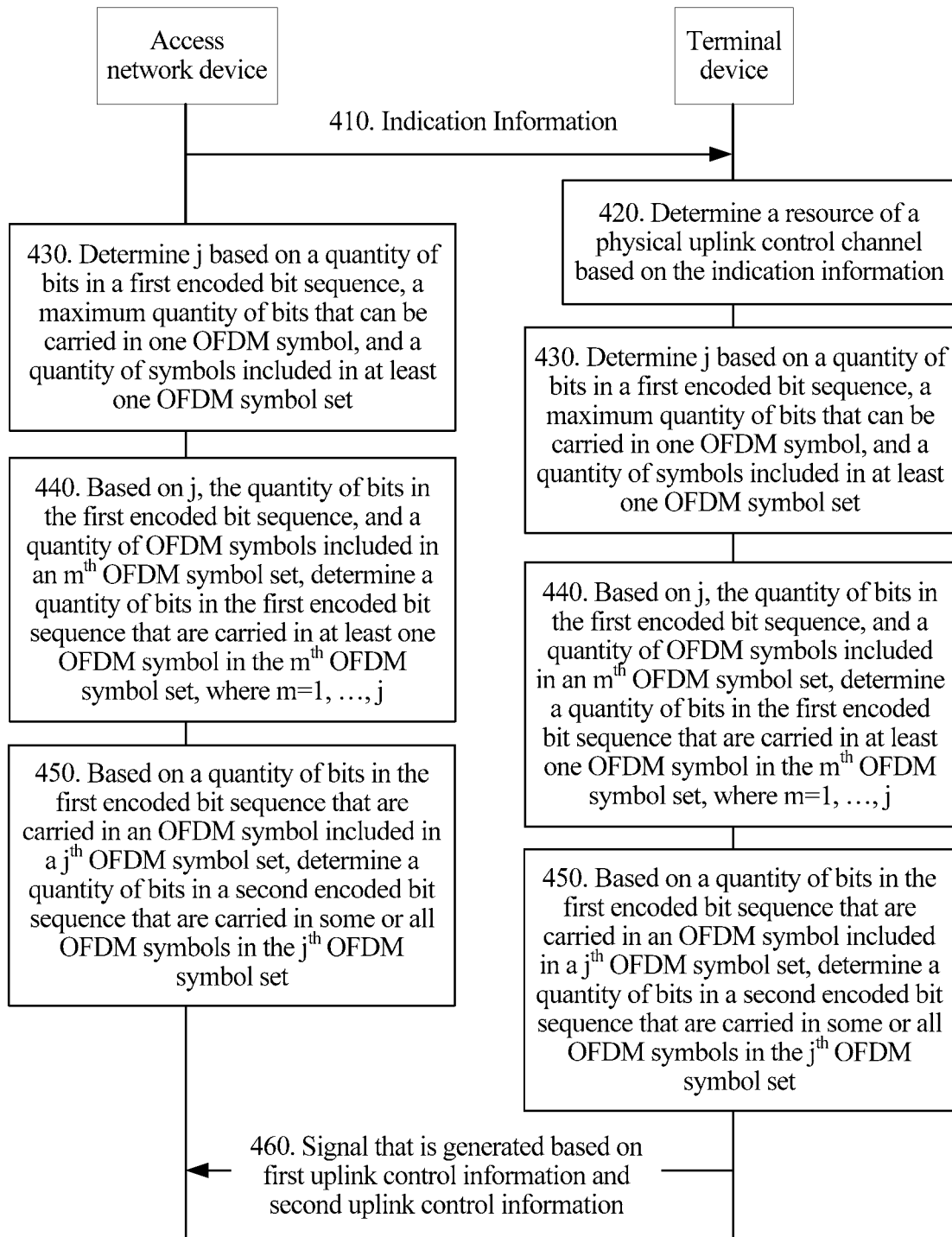
FIG. 4 is a schematic signaling diagram of a method according to an embodiment of the present disclosure.

This embodiment provides a sequence determining method. FIG. 4 is a schematic signaling diagram of the method according to this embodiment of the present disclosure. It should be noted that some steps in FIG. 4 and in the following are optional, and there is no limitation that all steps need to be included in this embodiment of the present disclosure. In addition, numbers of steps are merely used for description and do not represent a sequence.

Step 410: An access network device sends indication information to a terminal device, and the terminal device receives the indication information.

The indication information indicates a physical uplink control channel resource.

The action in this step may be implemented by the transceiver 301 in the terminal device 104 described above. Certainly, the action in this step may be implemented by the modem processor 304 and the transceiver 301 in the terminal device 104 described above. The action in this step may be implemented by the transceiver 202 in the access network device 102 described above. Certainly, the action in this step may be implemented by the processor 201 and the transceiver 202 in the access network device 102 described above.

Uplink control information carried in the physical uplink control channel includes two parts. A first part of the uplink control information may include an HARQ-ACK and/or first CSI, and a second part of the uplink control information may include second CSI. The first CSI may include information such as a CQI of a first codeword and/or an RI. The second CSI may include information such as a CQI of a second codeword and/or a PMI. A first encoded bit sequence is generated by performing channel encoding on the first part of the uplink control information, and a joint encoding manner is used for the first part of the uplink control information, to be specific, HARQ-ACK and the first CSI are jointly encoded. A second encoded bit sequence is generated by performing channel encoding on the second part of the uplink control information. The second encoded bit sequence is obtained by independently encoding the second CSI.

Considering that both the first CSI and the HARQ-ACK information have a relatively high transmission reliability requirement, jointly encoding these two parts can reduce overheads of cyclic redundancy check (cyclic redundancy check, CRC) bits while ensuring high-reliability transmission. A quantity of bits of the second CSI is determined based on the information in the first CSI, and therefore the access network device needs to obtain the first CSI before receiving the second CSI. Therefore, channel encoding needs to be separately performed on the second CSI and the first CSI.

The physical uplink control channel resource includes N OFDM symbol sets, each of the N OFDM symbol sets includes one or more OFDM symbols, and N is a positive integer. The first modulated symbol is carried in an OFDM symbol included in j OFDM symbol sets, the j OFDM symbol sets are a part of or all of the N orthogonal frequency division multiplexing OFDM symbol sets, and j is a positive integer less than or equal to N.

It can be seen that in this embodiment of the present disclosure, when N is equal to 2 or 3, different OFDM symbol sets may include different quantities of OFDM symbols.

Optionally, N is equal to 1, 2, or 3 determined according to a structure definition of the predefined physical uplink control channel format 3 or 4. In an example of occupying four OFDM symbols, N is equal to 1 when a DMRS occupies two OFDM symbols.

The OFDM symbol set in this embodiment of the present disclosure can be used to map, as much as possible, the first encoded bit sequence to OFDM symbols close to an OFDM symbol carrying a DMRS, thereby improving reliability of the first encoded bit sequence, namely, first uplink control information.

Optionally, the indication information may be sent by using physical layer signaling. For example, the access network device sends downlink control information by using a physical downlink control channel, and the downlink control information carries the indication information.

Optionally, the indication information may be sent by using higher layer signaling. For example, the access network device sends the indication information by using radio resource control (RRC) signaling.

Optionally, the physical uplink control channel resource includes a quantity of OFDM symbols occupied by the physical uplink control channel in time domain, and the quantity of OFDM symbols occupied by the physical uplink control channel in time domain ranges from 4 to 14 OFDM symbols.

Optionally, before step 410, this embodiment may further include: configuring, by the access network device for the terminal device by using RRC signaling, whether frequency hopping is enabled on the physical uplink control channel Optionally, before step 410, this embodiment may further include: configuring, by the access network device, a quantity of symbols in the physical uplink control channel for the terminal device by using RRC signaling. If frequency hopping is disabled on the physical uplink control channel, then when the quantity of OFDM symbols occupied by the physical uplink control channel in time domain is greater than or equal to 10, two or four OFDM symbols are used to carry a DMRS. If frequency hopping is enabled on the physical uplink control channel, then when the quantity of OFDM symbols occupied by the physical uplink control channel in time domain is greater than or equal to 5, each frequency hopping unit has one or two OFDM symbols used to carry a DMRS.

In an implementation, when j is less than N, that is, when a quantity of bits included in the first encoded bit sequence is less than a maximum quantity of bits that can be carried in all OFDM symbols included in the j OFDM symbol sets, the first encoded bit sequence is carried only in the OFDM symbols included in the j OFDM symbol sets.

For example, if the first encoded bit sequence includes 20 bits, the PUCCH includes two OFDM symbol sets, and OFDM symbols in a first OFDM symbol set can carry 24 bits, the first encoded bit sequence is carried only in the OFDM symbol in the first OFDM symbol set, and a second OFDM symbol set of the PUCCH does not carry the first encoded bit sequence.

In this case, the first encoded bit sequence is always mapped to OFDM symbols that are in an OFDM symbol set and that are closest to an OFDM symbol carrying a DMRS, so that demodulation reliability of the first encoded bit sequence can be improved.

In another implementation, when j is equal to 1, there is only one OFDM symbol set, namely, a first OFDM symbol set, a part of or all of OFDM symbols included in the first OFDM symbol set carry a part of or all of bits in the second encoded bit sequence and a part of or all of bits in the first encoded bit sequence, and a difference between quantities of encoded bits in the first encoded bit sequence that are carried in any two of the part of or all of OFDM symbols is less than or equal to 1.

For example, the first OFDM symbol set includes four OFDM symbols, each OFDM symbol can carry 12 bits, and the first encoded bit sequence includes 18 bits in which 12 bits are carried in the $1^{st}$ OFDM symbol and 6 bits are carried in the $2^{nd}$ OFDM symbol, the $3^{rd}$ OFDM symbol, and the $4^{th}$ OFDM symbol, and each of the $1^{st}$ OFDM symbol, the $2^{nd}$ OFDM symbol, the $3^{rd}$ OFDM symbol, and the $4^{th}$ OFDM symbol carries two bits in the first encoded bit sequence. In this case, a difference between quantities of bits in the first encoded bit sequence that are carried in OFDM symbols carrying both the first encoded bit sequence and the second encoded bit sequence is 0.

For another example, the first OFDM symbol set includes four OFDM symbols, each OFDM symbol can carry 12 bits, the first encoded bit sequence includes eight bits, and the eight bits are carried in the $1^{st}$ OFDM symbol, the $2^{nd}$ OFDM symbol, the $3^{rd}$ OFDM symbol, and the $4^{th}$ OFDM symbol, and each of the $1^{st}$ OFDM symbol, the $2^{nd}$ OFDM symbol, the $3^{rd}$ OFDM symbol, and the $4^{th}$ OFDM symbol carries two bits in the first encoded bit sequence. In this case, a difference between quantities of bits in the first encoded bit sequence that are carried in OFDM symbols carrying both the first encoded bit sequence and the second encoded bit sequence is 0.

In this implementation, the bits in the first encoded bit sequence can be mapped to the part of or all of OFDM symbols included in the first OFDM symbol set as evenly as possible. This even distribution manner can maximize a diversity gain of the first encoded bit sequence, to avoid burst interference caused by a specific OFDM symbol to the first encoded bit sequence.

In another implementation, when j is equal to 2, the j OFDM symbol sets include a first OFDM symbol set and a second OFDM symbol set, the first encoded bit sequence includes a first encoded bit set and a second encoded bit set, OFDM symbols included in the first OFDM symbol set carries the first encoded bit set but does not carry the second encoded bit sequence, a part of or all of OFDM symbols included in the second OFDM symbol set carry the second encoded bit set and a part of or all of bits in the second encoded bit sequence, and a difference between quantities of encoded bits in the second encoded bit set that are carried in any two of the part of or all of OFDM symbols is less than or equal to 1.

For example, the first OFDM symbol set includes two OFDM symbols, the second OFDM symbol set includes two OFDM symbols, each OFDM symbol can carry 12 bits, the first encoded bit sequence includes 30 bits in which 24 bits are carried in the OFDM symbols in the first OFDM symbol set and six bits are evenly carried in the OFDM symbols in the second OFDM symbol set, and each of the OFDM symbols in the second OFDM symbol set carries three bits in the first encoded bit sequence. In this case, a difference between quantities of bits in the first encoded bit sequence that are carried in OFDM symbols carrying both the first encoded bit sequence and the second encoded bit sequence is 0.

In this implementation, the bits in the first encoded bit sequence can be mapped to the part of or all of OFDM symbols included in the second OFDM symbol set as evenly as possible. This even distribution manner can maximize a diversity gain of the first encoded bit sequence, to avoid burst interference caused by a specific OFDM symbol to the first encoded bit sequence. In addition, OFDM symbols included in the first OFDM symbol set carry the first encoded bit set but does not carry the second encoded bit sequence, so that the first encoded bit sequence is carried, as much as possible, in symbols close to a DMRS.

Optionally, a quantity of encoded bits carried in OFDM symbols included in the second OFDM symbol set is determined based on a priority of the OFDM symbols, and a quantity of bits in the first encoded bit sequence that are carried in a high-priority OFDM symbol is greater than or equal to a quantity of bits in the first encoded bit sequence that are carried in a low-priority OFDM symbol.

For example, if the second OFDM symbol set includes OFDM symbol 0, an OFDM symbol 4, and an OFDM symbol 8, a priority of the OFDM symbol 0 is higher than that of the OFDM symbol 4, and a priority of the OFDM symbol 4 is higher than that of the OFDM symbol 8, when the OFDM symbols in the second OFDM symbol set need to carry seven encoded bits, the OFDM symbol 0 carries three bits, the OFDM symbol 4 carries two bits, and the OFDM symbol 8 carries two bits.

Because different OFDM symbols have different priorities, in this embodiment, the first encoded bit sequence may be mapped to two frequency hopping units of the physical uplink control channel as symmetrically as possible, to maximize a frequency diversity gain of the frequency hopping units.

In another implementation, when j is equal to 3, the j OFDM symbol sets include a first OFDM symbol set, a second OFDM symbol set, and a third OFDM symbol set, the first encoded bit sequence includes a first encoded bit set and a second encoded bit set, OFDM symbols included in the first OFDM symbol set and the second OFDM symbol set carry the first encoded bit set but do not carry the second encoded bit sequence, a part of or all of OFDM symbols included in the third OFDM symbol set carry the second encoded bit set and a part of or all of bits in the second encoded bit sequence, and a difference between quantities of encoded bits in the second encoded bit set that are carried in any two of the part of or all of OFDM symbols is less than or equal to 1.

For example, the first OFDM symbol set includes four OFDM symbols, the second OFDM symbol set includes four OFDM symbols, the third OFDM symbol set includes four OFDM symbols, each OFDM symbol can carry 12 bits, and the first encoded bit sequence includes 120 bits in which 48 bits are carried in the OFDM symbols in the first OFDM symbol set, 48 bits are carried in the OFDM symbols in the second OFDM symbol set, and 24 bits are evenly carried in the OFDM symbols in the third OFDM symbol set, and each of the OFDM symbols in the third OFDM symbol set carries six bits in the first encoded bit sequence. In this case, a difference between quantities of bits in the first encoded bit sequence that are carried in OFDM symbols carrying both the first encoded bit sequence and the second encoded bit sequence is 0.

In this implementation, the bits in the first encoded bit sequence can be mapped, as evenly as possible, to the part of or all of OFDM symbols included in the third OFDM symbol set. This even distribution manner can maximize a diversity gain of the first encoded bit sequence, to avoid burst interference caused by a specific OFDM symbol to the first encoded bit sequence.

Optionally, a quantity of encoded bits carried in OFDM symbols included in the third OFDM symbol set is determined based on priorities of the OFDM symbols, and a quantity of bits in the first encoded bit sequence that are carried in a high-priority OFDM symbol is greater than or equal to a quantity of bits in the first encoded bit sequence that are carried in a low-priority OFDM symbol.

For example, if the third OFDM symbol set includes OFDM symbol 0, OFDM symbol 4, and OFDM symbol 8, a priority of the OFDM symbol 0 is higher than that of the OFDM symbol 4, and a priority of the OFDM symbol 4 is higher than that of the OFDM symbol 8, when the OFDM symbols in the third OFDM symbol set need to carry seven encoded bits, the OFDM symbol 0 carries three bits, the OFDM symbol 4 carries two bits, and the OFDM symbol 8 carries two bits.

Because different OFDM symbols have different priorities, in this embodiment, the first encoded bit sequence may be mapped to two frequency hopping units of the physical uplink control channel as symmetrically as possible, to maximize a frequency diversity gain of the frequency hopping units.

Optionally, in terms of the foregoing priority, an OFDM symbol with a smaller index may have a higher priority in one OFDM symbol set.

Step 420: The terminal device determines a physical uplink control channel resource based on the indication information.

The action in this step may be implemented by the transceiver 301 in the terminal device 104 described above. Certainly, the action in this step may be implemented by the modem processor 304 and the transceiver 301 in the terminal device 104 described above.

Step 430: The terminal device and the access network device determine j based on a quantity of bits in the first encoded bit sequence, a maximum quantity of bits that can be carried in one OFDM symbol, and a quantity of symbols included in at least one OFDM symbol set.

The action in this step may be implemented by the modem processor 304 in the terminal device 104 described above. The action in this step may be implemented by the processor 201 in the access network device 102 described above.

When j is equal to 1, the j OFDM symbol sets include a first OFDM symbol set; or when j is equal to 2, the j OFDM symbol sets include a first OFDM symbol set and a second OFDM symbol set; or when j is equal to 3, the j OFDM symbol sets include a first OFDM symbol set, a second OFDM symbol set, and a second OFDM symbol set.

For example, if the first encoded bit sequence has 20 bits, one OFDM symbol can carry a maximum of 12 bits, and a first OFDM symbol set includes two OFDM symbols, then j is equal to 1, and the j OFDM symbol sets include the first OFDM symbol set.

For another example, if the first encoded bit sequence has 40 bits, one OFDM symbol can carry a maximum of 12 bits, a first OFDM symbol set includes two OFDM symbols, and a second OFDM symbol set includes two OFDM symbols, j is equal to 2, wherein the j OFDM symbol sets include the first OFDM symbol set and the second OFDM symbol set.

For another example, if the first encoded bit sequence has 100 bits, one OFDM symbol can carry a maximum of 12 bits, a first OFDM symbol set includes four OFDM symbols, a second OFDM symbol set includes four OFDM symbols, and a third OFDM symbol set includes four OFDM symbols, then j is equal to 3, wherein the j OFDM symbol sets include the first OFDM symbol set, the second OFDM symbol set, and the third OFDM symbol set.

It should be noted that in this embodiment of the present disclosure, the maximum quantity of bits that can be carried in one OFDM symbol does not represent a particular OFDM symbol, and may be any OFDM symbol.

Step 440: The terminal device and the access network device determine, based on j, the quantity of bits in the first encoded bit sequence, and a quantity of OFDM symbols included in an $m^{th}$ OFDM symbol set, a quantity of bits in the first encoded bit sequence that are carried in at least one OFDM symbol in the $m^{th}$ OFDM symbol set, where m= 1, . . . , j.

The action in this step may be implemented by the modem processor 304 in the terminal device 104 described above. The action in this step may be implemented by the processor 201 in the access network device 102 described above.

Further, when j=1, a quantity of bits in the first encoded bit sequence that are carried in at least one OFDM symbol in the first OFDM symbol set is determined based on the quantity of bits in the first encoded bit sequence and a quantity of OFDM symbols included in the first OFDM symbol set.

For example, if the first encoded bit sequence has 18 bits, one OFDM symbol can carry a maximum of 12 bits, and the first OFDM symbol set includes four OFDM symbols, j is equal to 1, the $1^{st}$ OFDM symbol carries 12 bits in the first encoded bit sequence, the $2^{nd}$ OFDM symbol carries two bits in the first encoded bit sequence, the $3^{rd}$ OFDM symbol carries two bits in the first encoded bit sequence, and the $4^{th}$ OFDM symbol carries two bits in the first encoded bit sequence.

For example, if the first encoded bit sequence has 16 bits, one OFDM symbol can carry a maximum of 12 bits, and the first OFDM symbol set includes four OFDM symbols, j is equal to 1, the $1^{st}$ OFDM symbol carries four bits in the first encoded bit sequence, the $2^{nd}$ OFDM symbol carries four bits in the first encoded bit sequence, the $3^{rd}$ OFDM symbol carries four bits in the first encoded bit sequence, and the $4^{th}$ OFDM symbol carries four bits in the first encoded bit sequence.

Further, when j=2, a quantity of bits in the first encoded bit sequence that are carried in all OFDM symbols in the first OFDM symbol set is determined based on the maximum quantity of bits that can be carried in one OFDM symbol, and a quantity of bits in the first encoded bit sequence that are carried in at least one OFDM symbol in the second OFDM symbol set is determined based on the quantity of bits in the first encoded bit sequence, a quantity of OFDM symbols included in the first OFDM symbol set, the maximum quantity of bits that can be carried in one OFDM symbol, and a quantity of symbols included in the second OFDM symbol set.

For example, if the first encoded bit sequence has 60 bits, one OFDM symbol can carry a maximum of 12 bits, the first OFDM symbol set includes four OFDM symbols, and the second OFDM symbol set includes four OFDM symbols, then j is equal to 2, and in the second OFDM symbol set, the $1^{st}$ OFDM symbol carries 12 bits in the first encoded bit sequence, the $2^{nd}$ OFDM symbol carries 0 bits in the first encoded bit sequence, the $3^{rd}$ OFDM symbol carries 0 bits in the first encoded bit sequence, and the $4^{th}$ OFDM symbol carries 0 bits in the first encoded bit sequence.

For example, if the first encoded bit sequence has 60 bits, one OFDM symbol can carry a maximum of 12 bits, the first OFDM symbol set includes four OFDM symbols, and the second OFDM symbol set includes four OFDM symbols, then j is equal to 2, and in the second OFDM symbol set, the $1^{st}$ OFDM symbol carries three bits in the first encoded bit sequence, the $2^{nd}$ OFDM symbol carries three bits in the first encoded bit sequence, the $3^{rd}$ OFDM symbol carries three bits in the first encoded bit sequence, and the $4^{th}$ OFDM symbol carries three bits in the first encoded bit sequence.

Further, when j is equal to 3, a quantity of bits in the first encoded bit sequence that are carried in all OFDM symbols in the first OFDM symbol set and the second OFDM symbol set is determined based on the maximum quantity of bits that can be carried in one OFDM symbol, and a quantity of bits in the first encoded bit sequence that are carried in at least one OFDM symbol in the third OFDM symbol set is determined based on the quantity of bits in the first encoded bit sequence, a quantity of OFDM symbols included in the first OFDM symbol set and the second OFDM symbol set, the maximum quantity of bits that can be carried in one OFDM symbol, and a quantity of symbols included in the third OFDM symbol set.

For example, if the first encoded bit sequence has 108 bits, one OFDM symbol can carry a maximum of 12 bits, the first OFDM symbol set includes four OFDM symbols, the second OFDM symbol set includes four OFDM symbols, and the third OFDM symbol set includes four OFDM symbols, then j is equal to 3, and in the third OFDM symbol set, the $1^{st}$ OFDM symbol carries 12 bits in the first encoded bit sequence, the $2^{nd}$ OFDM symbol carries 0 bits in the first encoded bit sequence, the $3^{rd}$ OFDM symbol carries 0 bits in the first encoded bit sequence, and the $4^{th}$ OFDM symbol carries 0 bits in the first encoded bit sequence.

For example, if the first encoded bit sequence has 108 bits, one OFDM symbol can carry a maximum of 12 bits, the first OFDM symbol set includes four OFDM symbols, the second OFDM symbol set includes four OFDM symbols, and the third OFDM symbol set includes four OFDM symbols, then j is equal to 3, and in the third OFDM symbol set, the $1^{st}$ OFDM symbol carries four bits in the first encoded bit sequence, the $2^{nd}$ OFDM symbol carries four bits in the first encoded bit sequence, the $3^{rd}$ OFDM symbol carries four bits in the first encoded bit sequence, and the $4^{th}$ OFDM symbol carries four bits in the first encoded bit sequence.

Step 450: The terminal device and the access network device determine, based on a quantity of bits in the first encoded bit sequence that are carried in OFDM symbols included in a $j^{th}$ OFDM symbol set, a quantity of bits in the second encoded bit sequence that are carried in some or all OFDM symbols in the $j^{th}$ OFDM symbol set.

The action in this step may be implemented by the modem processor 304 in the terminal device 104 described above. The action in this step may be implemented by the processor 201 in the access network device 102 described above.

For example, if the first encoded bit sequence has 108 bits, one OFDM symbol can carry a maximum of 12 bits, the first OFDM symbol set includes four OFDM symbols, the second OFDM symbol set includes four OFDM symbols, and the third OFDM symbol set includes four OFDM symbols, then j is equal to 3, and in the third OFDM symbol set, the $1^{st}$ OFDM symbol carries 12 bits in the first encoded bit sequence, the $2^{nd}$ OFDM symbol carries 0 bits in the first encoded bit sequence, the $3^{rd}$ OFDM symbol carries 0 bits in the first encoded bit sequence, and the $4^{th}$ OFDM symbol carries 0 bits in the first encoded bit sequence. In this case, in the third OFDM symbol set, the $1^{st}$ OFDM symbol carries 0 bits in the second encoded bit sequence, the $2^{nd}$ OFDM symbol carries 12 bits in the second encoded bit sequence, the $3^{rd}$ OFDM symbol carries 12 bits in the second encoded bit sequence, and the $4^{th}$ OFDM symbol carries 12 bits in the second encoded bit sequence.

For example, if the first encoded bit sequence has 108 bits, one OFDM symbol can carry a maximum of 12 bits, the first OFDM symbol set includes four OFDM symbols, the second OFDM symbol set includes four OFDM symbols, and the third OFDM symbol set includes four OFDM symbols, then j is equal to 3, and in the third OFDM symbol set, the $1^{st}$ OFDM symbol carries four bits in the first encoded bit sequence, the $2^{nd}$ OFDM symbol carries four bits in the first encoded bit sequence, the $3^{rd}$ OFDM symbol carries four bits in the first encoded bit sequence, and the $4^{th}$ OFDM symbol carries four bits in the first encoded bit sequence. In this case, in the third OFDM symbol set, the $1^{st}$ OFDM symbol carries eight bits in the second encoded bit sequence, the $2^{nd}$ OFDM symbol carries eight bits in the second encoded bit sequence, the $3^{rd}$ OFDM symbol carries eight bits in the second encoded bit sequence, and the $4^{th}$ OFDM symbol carries eight bits in the second encoded bit sequence.

It should be noted that in this embodiment, steps 430 to 450 are optional steps. The access network device and the terminal device may determine, in another manner, bits carried in an OFDM symbol.

Step 460: The terminal device sends, on the physical uplink control channel resource, a signal that is generated based on the first uplink control information and the second uplink control information, and the access network device receives, on the physical uplink control channel resource, the signal that is generated based on the first uplink control information and the second uplink control information.

The action in this step may be implemented by the transceiver 301 in the terminal device 104 described above. Certainly, the action in this step may be implemented by the modem processor 304 and the transceiver 301 in the terminal device 104 described above. The action in this step may be implemented by the transceiver 202 in the access network device 102 described above. Certainly, the action in this step may be implemented by the processor 201 and the transceiver 202 in the access network device 102 described above.

Further, the terminal device may determine, according to the foregoing rules, a quantity of bits in the first encoded bit sequence that are carried in each OFDM symbol and a quantity of bits in the second encoded bit sequence that are carried in each OFDM symbol, and further determine an unscrambled bit sequence. A scrambled bit sequence is generated by scrambling the unscrambled bit sequence using scrambling code. The terminal device determines, based on the scrambled bit sequence, scrambled bits carried in each OFDM symbol. After performing fast Fourier transform (FFT) on the scrambled bit carried in each OFDM symbol, the terminal device maps bits to a corresponding symbol, so as to generate a frequency-domain signal. Further, the terminal device generates a time-domain signal after performing inverse fast Fourier transform (IFFT) on the frequency-domain signal. The terminal device generates a signal by padding a cyclic prefix (CP) to the time-domain signal, and sends the signal.

The action of receiving, by the access network device on the physical uplink control channel resource, the signal that is generated based on the first uplink control information and the second uplink control information may be understood as an action of reading, by the access network device, the signal, or may be understood as an action of obtaining the first uplink control information and the second uplink control information through demodulation. This is not limited in this embodiment of the present disclosure.

The OFDM symbol set in this embodiment of the present disclosure can be used to map, as much as possible, the first encoded bit sequence to OFDM symbols close to an OFDM symbol carrying a DMRS, thereby improving reliability of the first uplink control information.

OFDM symbols in different OFDM symbol sets have different intervals with an OFDM symbol carrying a DMRS, and OFDM symbols in one OFDM symbol set have a same interval with an OFDM symbol carrying a DMRS. The OFDM symbol set can be defined to map, as much as possible, the first encoded bit sequence to OFDM symbols close to an OFDM symbol carrying a DMRS.

It should be noted that a sequence of the foregoing steps is not limited in this embodiment of the present disclosure, and the sequence numbers of the steps are not used to limit the sequence of the steps in this embodiment of the present disclosure. For example, the actions of the access network device in steps 430 to 450 may be performed after the terminal device sends the signal in step 460. The access network device may read the signal in step 460 before performing the actions in steps 430 to 450, and then obtain the first uplink control information and the second uplink control information through demodulation.

An embodiment of the present disclosure further provides an apparatus (for example, an integrated circuit, a wireless device, or a circuit module) configured to implement the foregoing method. The apparatus implementing a power tracker and/or a power supply generator described in this specification may be an independent device, or may be a part of a relatively large device. The device may be (i) an independent IC; (ii) a set of ICs that has one or more ICs, the set of ICs can include a memory IC configured to store data and/or an instruction; (iii) an RFIC, for example, an RF receiver or an RF transmitter; (iv) an ASIC, for example, a mobile station modem; (v) a module that can be embedded in another device; (vi) a receiver, a cellular phone, a wireless device, a handheld machine, or a mobile unit; or (vii) the like.

The method and apparatus that are provided in the embodiments of the present disclosure may be applied to the terminal device or the access network device (both the terminal device and the access network device may be referred to as a wireless device). The terminal device, the access network device, or the wireless device may include a hardware layer, an operating system layer that is run on the hardware layer, and an application layer that is run on the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing the method is not limited in the embodiments of the present disclosure, provided that the entity can perform communication according to the wireless communication method in the embodiments of the present disclosure by running a program of code recording the method in the embodiments of the present disclosure. For example, the wireless communication method in the embodiments of the present disclosure may be performed by the terminal device, the access network device, or a function module that is in the terminal device or the access network device and that can invoke a program and execute the program.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of the embodiments of the present disclosure.

In addition, the aspects or features in the embodiments of the present disclosure may be implemented as a method, an apparatus, or a product that uses standard programming and/or engineering technologies. The term "product" used in this application covers a computer program that can be accessed from any computer readable component, carrier, or medium. For example, the computer readable medium may include but is not limited to: a magnetic storage component (for example, a hard disk, a floppy disk, or a magnetic tape), an optical disc (for example, a compact disc (CD), or a digital versatile disc (DVD), a smart card and a flash memory component (for example, an erasable programmable read only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, include, and/or carry an instruction and/or data.

All or some of the foregoing embodiments may be implemented by software, hardware, firmware, or any combination thereof. When all or some of the foregoing embodiments are implemented by software, all or some of the foregoing embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

A person skilled in the art may clearly understand that for the purpose of convenient and brief description, for a detailed working process of the foregoing system, apparatus, and unit, reference may be made to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on an actual requirement, to achieve the objectives of the solutions in the embodiments.

When the functions are implemented in a form of a software function unit and sold or used as an independent product, the functions may be stored in a computer readable storage medium. Based on such an understanding, the technical solutions in the embodiments of the present disclosure essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the method described in the embodiments of the present disclosure. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of the present disclosure, but are not intended to limit the protection scope of the embodiments of the present disclosure. Any variation or replacement readily figured out by a person skilled in the art within the technical scope disclosed in the embodiments of the present disclosure shall fall within the protection scope of the embodiments of the present disclosure.

What is claimed is:

1. A communication method, comprising:
   determining, by a network device, a resource for a physical uplink control channel, wherein
   the physical uplink control channel is for carrying a first encoded bit sequence and a second encoded bit sequence, the first encoded bit sequence corresponding to first uplink control information, wherein the first uplink control information comprises a hybrid automatic repeat request-acknowledgment (HARQ-ACK) and/or first channel state information (CSI), the second encoded bit sequence corresponding to second uplink control information, wherein the second uplink control information comprises second CSI, and wherein
   the resource comprises N orthogonal frequency division multiplexing (OFDM) symbol sets, the N OFDM symbol sets comprising M OFDM symbols in total in a slot, 4<=M<=14, and each of the OFDM symbol sets comprising one or more OFDM symbols;
   determining, by the network device, a quantity of OFDM symbol sets for carrying the first encoded bit sequence in the N OFDM symbol sets based on a quantity of bits in the first encoded bit sequence, a maximum quantity of bits carried in one OFDM symbol, and a quantity of symbols in at least one OFDM symbol set, such that the quantity of bits in the first encoded bit sequence is less than or equal to a maximum quantity of bits that can be carried in all OFDM symbols in the j OFDM symbol sets, wherein
   the quantity of OFDM symbol sets is j, the quantity of bits in the first encoded bit sequence is less than a maximum quantity of bits that can be carried in all OFDM symbols in the j OFDM symbol sets, wherein the first encoded bit sequence is carried only in OFDM symbols in the j OFDM symbol sets, N is a positive integer, and j is a positive integer less than or equal to N;
   if N=2, the N OFDM symbols sets comprises a first OFDM symbol set and a second OFDM symbol set, the first symbol set comprises OFDM symbols next to one or more OFDM symbols carrying demodulated reference signal (DMRS), the second symbol set comprises OFDM symbols second next to the one or more OFDM symbols carrying the DMRS, and the j OFDM sets are the first j OFDM symbol sets in the N OFDM symbols sets; and
   if N=3, the N OFDM symbols sets comprises a first OFDM symbol set, a second OFDM symbol set, and a third OFDM symbol set, the first symbol set comprises OFDM symbols next to one or more OFDM symbols carrying DMRS, the second symbol set comprises OFDM symbols second next to the one or more OFDM symbols carrying the DMRS, the third symbol set comprises OFDM symbols third next to the one or more OFDM symbols carrying the DMRS, and the j OFDM sets are the first j OFDM symbol sets in the N OFDM symbols sets;
   and receiving, by the network device, on the resource for the physical uplink control channel, a signal carrying the first uplink control information and the second uplink control information.

2. The method of claim 1, wherein
   when j is equal to 1, the j OFDM symbol sets comprise the first OFDM symbol set, a part of or all of OFDM symbols in the first OFDM symbol set carry a part of or all of bits in the second encoded bit sequence and all bits in the first encoded bit sequence, and the bits in the first encoded bit sequence are carried in the part of or all of OFDM symbols as evenly as possible.

3. The method of claim 1, wherein
   when j is equal to 2, the j OFDM symbol sets comprise a first OFDM symbol set and a second OFDM symbol set, the first encoded bit sequence comprises a first encoded bit set and a second encoded bit set, wherein OFDM symbols in the first OFDM symbol set carries the first encoded bit set but does not carry the second encoded bit sequence, a part of or all of OFDM symbols in the second OFDM symbol set carry the second encoded bit set and a part of or all of bits in the second encoded bit sequence, and bits in the second encoded bit set are carried in the part of or all of OFDM symbols as evenly as possible.

4. The method of claim 3, wherein
   a quantity of bits in the first encoded bit sequence carried in a high-priority OFDM symbol is greater than or equal to a quantity of bits in the first encoded bit sequence carried in a low-priority OFDM symbol.

5. The method of claim 1, wherein
   when j is equal to 3,
   the j OFDM symbol sets comprise the first OFDM symbol set, the second OFDM symbol set, and the third OFDM symbol set, and
   the first encoded bit sequence comprises a first encoded bit set and a second encoded bit set, and, wherein
   OFDM symbols in the first OFDM symbol set and the second OFDM symbol set carry the first encoded bit set but do not carry the second encoded bit sequence,
   a part of or all of OFDM symbols in the third OFDM symbol set carry the second encoded bit set and all bits in the second encoded bit sequence, and
   bits in the second encoded bit set are carried in the part of or all of OFDM symbols as evenly as possible.

6. The method of claim 5, wherein
   a quantity of encoded bits carried in OFDM symbols in the third OFDM symbol set are determined based on priorities of the OFDM symbols, and a quantity of bits in the first encoded bit sequence carried in a high-priority OFDM symbol is greater than or equal to a quantity of bits in the first encoded bit sequence that are carried in a low-priority OFDM symbol.

7. The method of claim 6, wherein
   an OFDM symbol with a smaller index has a higher priority in the third OFDM symbol set.

8. The method of claim 1, wherein the method further comprises:
   determining, by the network device, based on a quantity of bits in the first encoded bit sequence carried in OFDM symbols in a $j^{th}$ OFDM symbol set, a quantity of bits in the second encoded bit sequence carried in a part of or all of OFDM symbols in the $j^{th}$ OFDM symbol set.

9. The method of claim 1, wherein
when the resource for the physical uplink control channel occupies OFDM symbol 0, OFDM symbol 1, OFDM symbol 2, and OFDM symbol 3, wherein
when N=2, the OFDM symbol 1 carries a demodulation reference signal (DMRS), and
the N OFDM symbol sets comprise the first OFDM symbol set and the second OFDM symbol set, wherein
the first OFDM symbol set comprises the OFDM symbol 0 and the OFDM symbol 2, and the second OFDM symbol set comprises the OFDM symbol 3;
when the resource for the physical uplink control channel occupies OFDM symbol 0, OFDM symbol 1, OFDM symbol 2, and OFDM symbol 3, one of the following is true for the resource for the physical uplink control channel:
the resource for the physical uplink control channel occupies OFDM symbol 0, OFDM symbol 1, OFDM symbol 2, OFDM symbol 3, OFDM symbol 4, OFDM symbol 5, and OFDM symbol 6, N=2, the OFDM symbol 1 and the OFDM symbol 4 are used to carry a DMRS, the N OFDM symbol sets comprise a first OFDM symbol set and a second OFDM symbol set, the first OFDM symbol set comprises the OFDM symbol 0, the OFDM symbol 2, the OFDM symbol 3, and the OFDM symbol 5, and the second OFDM symbol set comprises the OFDM symbol 6;
the resource for the physical uplink control channel occupies OFDM symbol 0, OFDM symbol 1, OFDM symbol 2, OFDM symbol 3, OFDM symbol 4, OFDM symbol 5, OFDM symbol 6, and OFDM symbol 7, N=2, the OFDM symbol 1 and the OFDM symbol 5 are used to carry a DMRS, the N OFDM symbol sets comprise a first OFDM symbol set and a second OFDM symbol set, the first OFDM symbol set comprises the OFDM symbol 0, the OFDM symbol 2, the OFDM symbol 4, and the OFDM symbol 6, and the second OFDM symbol set comprises the OFDM symbol 3 and the OFDM symbol 7;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, and OFDM symbol 8, N=2, the OFDM symbol 1 and the OFDM symbol 6 are used to carry a demodulation reference signal DMRS, the N OFDM symbol sets comprise a first OFDM symbol set and a second OFDM symbol set, the first OFDM symbol set comprises the OFDM symbol 0, the OFDM symbol 2, the OFDM symbol 5, and the OFDM symbol 7, and the second OFDM symbol set comprises the OFDM symbol 3, the OFDM symbol 4, and the OFDM symbol 8;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, and OFDM symbol 9, N=2, the OFDM symbol 2 and the OFDM symbol 7 are used to carry a DMRS, the N OFDM symbol sets comprise a first OFDM symbol set and a second OFDM symbol set, the first OFDM symbol set comprises the OFDM symbol 1, the OFDM symbol 3, the OFDM symbol 6, and the OFDM symbol 8, and the second OFDM symbol set comprises the OFDM symbol 0, the OFDM symbol 4, the OFDM symbol 5, and the OFDM symbol 9;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, and OFDM symbol 10, N=3, the OFDM symbol 2 and the OFDM symbol 7 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 6, and the OFDM symbol 8, the second OFDM symbol set comprises the OFDM symbol 0, the OFDM symbol 4, the OFDM symbol 5, and the OFDM symbol 9, and the third OFDM symbol set comprises the OFDM symbol 10;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, and OFDM symbol 11, N=3, the OFDM symbol 2 and the OFDM symbol 8 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 7, and the OFDM symbol 9, the second OFDM symbol set comprises the OFDM symbol 0, the OFDM symbol 4, the OFDM symbol 6, and the OFDM symbol 10, and the third OFDM symbol set comprises the OFDM symbol 5 and the OFDM symbol 11;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=3, the OFDM symbol 2 and the OFDM symbol 9 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 8, and the OFDM symbol 10, the second OFDM symbol set comprises the OFDM symbol 0, the OFDM symbol 4, the OFDM symbol 7, and the OFDM symbol 11, and the third OFDM symbol set comprises the OFDM symbol 5, the OFDM symbol 6, and the OFDM symbol 12;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=2, the OFDM symbol 1, the OFDM symbol 4, the OFDM symbol 7, and the OFDM symbol 11 are used to carry a DMRS, the N OFDM symbol sets comprise a first OFDM symbol set, and a second OFDM symbol set, the first OFDM symbol set comprises the OFDM symbol 0, the OFDM symbol 2, the OFDM symbol 3, the OFDM symbol 5, the OFDM symbol 6, the OFDM symbol 8, the OFDM symbol 10, and the OFDM symbol 12, and the second OFDM symbol set comprises the OFDM symbol 9;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=3, the OFDM symbol 3 and the OFDM symbol 10 are used to carry a DMRS, the N OFDM symbol sets comprise a first OFDM symbol set, a second OFDM symbol set, and a third OFDM symbol set, the first OFDM symbol set comprises the OFDM symbol 2, the OFDM symbol 4, the OFDM symbol 9, and the OFDM symbol 11, the second OFDM symbol set comprises the OFDM symbol 1, the OFDM symbol 5, the OFDM symbol 8, and the OFDM symbol 12, and the third OFDM symbol set comprises the OFDM symbol 0, the OFDM symbol 6, the OFDM symbol 7, and the OFDM symbol 13; or the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=2, the OFDM symbol 1, the OFDM symbol 5, the OFDM symbol 8, and the OFDM symbol 12 are used to carry a DMRS, the N OFDM symbol sets comprise a first OFDM symbol set, and a second OFDM symbol set, the first OFDM symbol set comprises the OFDM symbol 0, the OFDM symbol 2, the OFDM symbol 4, the OFDM symbol 6, the OFDM symbol 7, the OFDM symbol 9, the OFDM symbol 11, and the OFDM symbol 13, and the second OFDM symbol set comprises the OFDM symbol 3 and the OFDM symbol 10.

10. The method of claim 1, wherein a difference between quantities of encoded bits in the first encoded bit sequence that are carried in any two of the part of or all of OFDM symbols is less than or equal to maximum bits that can be carried in a resource element (RE).

11. A communication apparatus, comprising:
a storage medium including executable instructions; and
a processor;
wherein the executable instructions, when executed by the processor, cause the apparatus to:
determine a resource for a physical uplink control channel, wherein
the physical uplink control channel is for carrying a first encoded bit sequence and a second encoded bit sequence, the first encoded bit sequence corresponding to first uplink control information, the second encoded bit sequence corresponding to second uplink control information, wherein the first uplink control information comprises a hybrid automatic repeat request-acknowledgment (HARQ-ACK) and/or first channel state information (CSI), and the second uplink control information comprises second CSI, and wherein
the resource comprises N orthogonal frequency division multiplexing (OFDM) symbol sets, the N OFDM symbol sets comprising M OFDM symbols in total in a slot, 4<=M<=14, and each of the OFDM symbol sets comprising one or more OFDM symbols;
determine a quantity of OFDM symbol sets for carrying the first encoded bit sequence in the N OFDM symbol sets based on a quantity of bits in the first encoded bit sequence, a maximum quantity of bits that can be carried in one OFDM symbol, and a quantity of symbols in at least one OFDM symbol set, such that the quantity of bits in the first encoded bit sequence is less than or equal to a maximum quantity of bits that can be carried in all OFDM symbols in the j OFDM symbol sets, wherein the quantity of OFDM symbol sets is j, the quantity of bits in the first encoded bit sequence is less than a maximum quantity of bits that can be carried in all OFDM symbols in the j OFDM symbol sets, and wherein the first encoded bit sequence is carried only in OFDM symbols in the j OFDM symbol sets, N is a positive integer, and j is a positive integer less than or equal to N;

if N=2, the N OFDM symbols sets comprises a first OFDM symbol set and a second OFDM symbol set, the first symbol set comprises OFDM symbols next to one or more OFDM symbols carrying demodulated reference signal (DMRS), the second symbol set comprises OFDM symbols second next to the one or more OFDM symbols carrying the DMRS, and the j OFDM sets are the first j OFDM symbol sets in the N OFDM symbols sets; and if N=3, the N OFDM symbols sets comprises a first OFDM symbol set, a second OFDM symbol set, and a third OFDM symbol set, the first symbol set comprises OFDM symbols next to one or more OFDM symbols carrying DMRS, the second symbol set comprises OFDM symbols second next to the one or more OFDM symbols carrying the DMRS, the third symbol set comprises OFDM symbols third next to the one or more OFDM symbols carrying the DMRS, and the j OFDM sets are the first j OFDM symbol sets in the N OFDM symbols sets; and decode, on the resource for the physical uplink control channel, a signal carrying the first uplink control information and the second uplink control information.

12. The apparatus of claim 11, wherein
when j is equal to 1, the j OFDM symbol sets comprise the first OFDM symbol set, a part of or all of OFDM symbols in the first OFDM symbol set carry a part of or all of bits in the second encoded bit sequence and all bits in the first encoded bit sequence, and the bits in the first encoded bit sequence are carried in the part of or all of OFDM symbols as evenly as possible.

13. The apparatus of claim 11, wherein
when j is equal to 2, the j OFDM symbol sets comprise the first OFDM symbol set and the second OFDM symbol set, and the first encoded bit sequence comprises a first encoded bit set and a second encoded bit set, wherein OFDM symbols in the first OFDM symbol set carries the first encoded bit set but does not carry the second encoded bit sequence, a part of or all of OFDM symbols in the second OFDM symbol set carry the second encoded bit set and a part of or all of bits in the second encoded bit sequence, and bits in the second encoded bit set are carried in the part of or all of OFDM symbols as evenly as possible.

14. The apparatus of claim 13, wherein
a quantity of encoded bits carried in OFDM symbols in the second OFDM symbol set is determined based on priorities of the OFDM symbols, and a quantity of bits in the first encoded bit sequence that are carried in a high-priority OFDM symbol is greater than or equal to a quantity of bits in the first encoded bit sequence that are carried in a low-priority OFDM symbol.

15. The apparatus of claim 11, wherein
when j is equal to 3,
the j OFDM symbol sets comprise the first OFDM symbol set, the second OFDM symbol set, and the third OFDM symbol set, and
the first encoded bit sequence comprises a first encoded bit set and a second encoded bit set, wherein
OFDM symbols in the first OFDM symbol set and the second OFDM symbol set carry the first encoded bit set but do not carry the second encoded bit sequence,
a part of or all of OFDM symbols in the third OFDM symbol set carry the second encoded bit set and all bits in the second encoded bit sequence, and
bits in the second encoded bit set are carried in the part of or all of OFDM symbols as evenly as possible.

16. The apparatus of claim 15, wherein
a quantity of encoded bits carried in OFDM symbols in the third OFDM symbol set is determined based on priorities of the OFDM symbols, and a quantity of bits in the first encoded bit sequence that are carried in a high-priority OFDM symbol is greater than or equal to a quantity of bits in the first encoded bit sequence that are carried in a low-priority OFDM symbol.

17. The apparatus of claim 16, wherein
an OFDM symbol with a smaller index has a higher priority in the third OFDM symbol set.

18. The apparatus of claim 11, wherein the executable instructions, when executed by the processor, further cause the apparatus to:
determine, based on a quantity of bits in the first encoded bit sequence that are carried in OFDM symbols in a $j^{th}$ OFDM symbol set, a quantity of bits in the second encoded bit sequence that are carried in a part of or all of OFDM symbols in the $j^{th}$ OFDM symbol set.

19. The apparatus of claim 11, wherein
when the resource for the physical uplink control channel occupies OFDM symbol 0, OFDM symbol 1, OFDM symbol 2, and OFDM symbol 3, wherein
when N=2, the OFDM symbol 1 carries a demodulation reference signal (DMRS), and
the N OFDM symbol sets comprise a first OFDM symbol set and a second OFDM symbol set, wherein the first OFDM symbol set comprises the OFDM symbol 0 and the OFDM symbol 2, and the second OFDM symbol set comprises the OFDM symbol 3;
when the resource for the physical uplink control channel occupies OFDM symbol 0, OFDM symbol 1, OFDM symbol 2, and OFDM symbol 3, one of the following is true regarding the resource for the physical uplink control channel:
the resource for the physical uplink control channel occupies OFDM symbol 0, OFDM symbol 1, OFDM symbol 2, OFDM symbol 3, OFDM symbol 4, OFDM symbol 5, and OFDM symbol 6, N=2, the OFDM symbol 1 and the OFDM symbol 4 are used to carry a DMRS, the N OFDM symbol sets comprise a first OFDM symbol set and a second OFDM symbol set, the first OFDM symbol set comprises the OFDM symbol 0, the OFDM symbol 2, the OFDM symbol 3, and the OFDM symbol 5, and the second OFDM symbol set comprises the OFDM symbol 6;
the resource for the physical uplink control channel occupies OFDM symbol 0, OFDM symbol 1, OFDM symbol 2, OFDM symbol 3, OFDM symbol 4, OFDM symbol 5, OFDM symbol 6, and OFDM symbol 7, N=2, the OFDM symbol 1 and the OFDM symbol 5 are used to carry a DMRS, the N OFDM symbol sets comprise a first OFDM symbol set and a second OFDM symbol set, the first OFDM symbol set comprises the OFDM symbol 0, the OFDM symbol 2, the OFDM symbol 4, and the OFDM symbol 6, and the second OFDM symbol set comprises the OFDM symbol 3 and the OFDM symbol 7;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, and OFDM symbol 8, N=2, the OFDM symbol 1 and the OFDM symbol 6 are used to carry a demodulation reference signal DMRS, the N OFDM symbol sets comprise a first OFDM symbol set and a second OFDM symbol set, the first OFDM symbol set comprises the OFDM symbol 0, the OFDM symbol 2, the OFDM symbol 5, and the OFDM symbol 7, and the second OFDM symbol set comprises the OFDM symbol 3, the OFDM symbol 4, and the OFDM symbol 8;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, and OFDM symbol 9, N=2, the OFDM symbol 2 and the OFDM symbol 7 are used to carry a DMRS, the N OFDM symbol sets comprise a first OFDM symbol set and a second OFDM symbol set, the first OFDM symbol set comprises the OFDM symbol 1, the OFDM symbol 3, the OFDM symbol 6, and the OFDM symbol 8, and the second OFDM symbol set comprises the OFDM symbol 0, the OFDM symbol 4, the OFDM symbol 5, and the OFDM symbol 9;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, and OFDM symbol 10, N=3, the OFDM symbol 2 and the OFDM symbol 7 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 6, and the OFDM symbol 8, the second OFDM symbol set comprises the OFDM symbol 0, the OFDM symbol 4, the OFDM symbol 5, and the OFDM symbol 9, and the third OFDM symbol set comprises the OFDM symbol 10;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, and OFDM symbol 11, N=3, the OFDM symbol 2 and the OFDM symbol 8 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 7, and the OFDM symbol 9, the second OFDM symbol set comprises the OFDM symbol 0, the OFDM symbol 4, the OFDM symbol 6, and the OFDM symbol 10, and the third OFDM symbol set comprises the OFDM symbol 5 and the OFDM symbol 11;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=3, the OFDM symbol 2 and the OFDM symbol 9 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 8, and the OFDM symbol 10, the second OFDM symbol set comprises the OFDM symbol 0, the OFDM symbol 4, the OFDM symbol 7, and the OFDM symbol 11, and the third OFDM symbol set comprises the OFDM symbol 5, the OFDM symbol 6, and the OFDM symbol 12;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=2, the OFDM symbol 1, the OFDM symbol 4, the OFDM symbol 7, and the OFDM symbol 11 are used to carry a DMRS, the N OFDM symbol sets comprise a first OFDM symbol set, and a second OFDM symbol set, the first OFDM symbol set comprises the OFDM symbol 0, the OFDM symbol 2, the OFDM symbol 3, the OFDM symbol 5, the OFDM symbol 6, the OFDM symbol 8, the OFDM symbol 10, and the OFDM symbol 12, and the second OFDM symbol set comprises the OFDM symbol 9;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=3, the OFDM symbol 3 and the OFDM symbol 10 are used to carry a DMRS, the N OFDM symbol sets comprise a first OFDM symbol set, a second OFDM symbol set, and a third OFDM symbol set, the first OFDM symbol set comprises the OFDM symbol 2, the OFDM symbol 4, the OFDM symbol 9, and the OFDM symbol 11, the second OFDM symbol set comprises the OFDM symbol 1, the OFDM symbol 5, the OFDM symbol 8, and the OFDM symbol 12, and the third OFDM symbol set comprises the OFDM symbol 0, the OFDM symbol 6, the OFDM symbol 7, and the OFDM symbol 13; or the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=2, the OFDM symbol 1, the OFDM symbol 5, the OFDM symbol 8, and the OFDM symbol 12 are used to carry a DMRS, the N OFDM symbol sets comprise a first OFDM symbol set, and a second OFDM symbol set, the first OFDM symbol set comprises the OFDM symbol 0, the OFDM symbol 2, the OFDM symbol 4, the OFDM symbol 6, the OFDM symbol 7, the OFDM symbol 9, the OFDM symbol 11, and the OFDM symbol 13, and the second OFDM symbol set comprises the OFDM symbol 3 and the OFDM symbol 10.

20. The apparatus of claim 11, wherein a difference between quantities of encoded bits in the first encoded bit sequence that are carried in any two of the part of or all of OFDM symbols is less than or equal to maximum bits that can be carried in a resource element (RE).

21. A non-transitory computer-readable storage medium comprising instructions which, when executed by a network device, cause the network device to carry out the following:
determining a resource for a physical uplink control channel, wherein
the physical uplink control channel is for carrying a first encoded bit sequence and a second encoded bit sequence, the first encoded bit sequence corresponding to first uplink control information, the second encoded bit sequence corresponding to second uplink control information, wherein the first uplink control information comprises a hybrid automatic repeat request-acknowledgment (HARQ-ACK) and/or first channel state information (CSI), and the second uplink control information comprises second CSI, and wherein
the resource comprises N orthogonal frequency division multiplexing (OFDM) symbol sets, the N OFDM symbol sets comprising M OFDM symbols in total in a slot, $4 \leq M \leq 14$, and each of the OFDM symbol sets comprising one or more OFDM symbols;
determining a quantity of OFDM symbol sets for carrying the first encoded bit sequence in the N OFDM symbol sets based on a quantity of bits in the first encoded bit sequence, a maximum quantity of bits that can be carried in one OFDM symbol, and a quantity of symbols in at least one OFDM symbol set, such that the quantity of bits in the first encoded bit sequence is less than or equal to a maximum quantity of bits that can be carried in all OFDM symbols in the j OFDM symbol sets,
wherein the quantity of OFDM symbol sets is j, the quantity of bits in the first encoded bit sequence is less than a maximum quantity of bits that can be carried in all OFDM symbols in the j OFDM symbol sets, and wherein the first encoded bit sequence is carried only in OFDM symbols in the j OFDM symbol sets, N is a positive integer, and j is a positive integer less than or equal to N;
if N=2, the N OFDM symbols sets comprises a first OFDM symbol set and a second OFDM symbol set, the first symbol set comprises OFDM symbols next to one or more OFDM symbols carrying demodulated reference signal (DMRS), the second symbol set comprises OFDM symbols second next to the one or more OFDM symbols carrying the DMRS, and the j OFDM sets are the first j OFDM symbol sets in the N OFDM symbols sets;
and if N=3, the N OFDM symbols sets comprises a first OFDM symbol set, a second OFDM symbol set, and a third OFDM symbol set, the first symbol set comprises OFDM symbols next to one or more OFDM symbols carrying DMRS, the second symbol set comprises OFDM symbols second next to the one or more OFDM symbols carrying the DMRS, the third symbol set comprises OFDM symbols third next to the one or more OFDM symbols carrying the DMRS, and the j OFDM sets are the first j OFDM symbol sets in the N OFDM symbols sets;
and receiving, on the resource for the physical uplink control channel, a signal carrying the first uplink control information and the second uplink control information.

22. The non-transitory computer-readable storage medium of claim 21, wherein
when j is equal to 1, the j OFDM symbol sets comprise the first OFDM symbol set, wherein a part of or all of OFDM symbols in the first OFDM symbol set carry a part of or all of bits in the second encoded bit sequence and all bits in the first encoded bit sequence, and the bits in the first encoded bit sequence are carried in the part of or all of OFDM symbols as evenly as possible.

23. The non-transitory computer-readable storage medium of claim 21, wherein
when j is equal to 2, the j OFDM symbol sets comprise the first OFDM symbol set and the second OFDM symbol set, and the first encoded bit sequence comprises a first encoded bit set and a second encoded bit set, wherein OFDM symbols in the first OFDM symbol set carries the first encoded bit set but does not carry the second encoded bit sequence, a part of or all of OFDM symbols in the second OFDM symbol set carry the second encoded bit set and a part of or all of bits in the second encoded bit sequence, and bits in the second encoded bit set are carried in the part of or all of OFDM symbols as evenly as possible.

24. The non-transitory computer-readable storage medium of claim 23, wherein
a quantity of encoded bits carried in OFDM symbols in the second OFDM symbol set is determined based on priorities of the OFDM symbols, and a quantity of bits in the first encoded bit sequence that are carried in a high-priority OFDM symbol is greater than or equal to a quantity of bits in the first encoded bit sequence that are carried in a low-priority OFDM symbol.

25. The non-transitory computer-readable storage medium of claim 21, wherein
when j is equal to 3, the j OFDM symbol sets comprise the first OFDM symbol set, the second OFDM symbol set, and the third OFDM symbol set, and the first encoded bit sequence comprises a first encoded bit set and a second encoded bit set, and, wherein
OFDM symbols in the first OFDM symbol set and the second OFDM symbol set carry the first encoded bit set but do not carry the second encoded bit sequence,
a part of or all of OFDM symbols in the third OFDM symbol set carry the second encoded bit set and all bits in the second encoded bit sequence, and
bits in the second encoded bit set are carried in the part of or all of OFDM symbols as evenly as possible.

26. The non-transitory computer-readable storage medium of claim 25, wherein
a quantity of encoded bits carried in OFDM symbols in the third OFDM symbol set is determined based on priorities of the OFDM symbols, and a quantity of bits in the first encoded bit sequence that are carried in a high-priority OFDM symbol is greater than or equal to a quantity of bits in the first encoded bit sequence that are carried in a low-priority OFDM symbol.

27. The non-transitory computer-readable storage medium of claim 26, wherein
an OFDM symbol with a smaller index has a higher priority in the third OFDM symbol set.

28. The non-transitory computer-readable storage medium of claim 21, wherein
when the resource for the physical uplink control channel occupies OFDM symbol 0, OFDM symbol 1, OFDM symbol 2, and OFDM symbol 3, wherein
when N=2, the OFDM symbol 1 carries a demodulation reference signal (DMRS), and the N OFDM symbol sets comprise the first OFDM symbol set and the second OFDM symbol set, wherein
the first OFDM symbol set comprises the OFDM symbol 0 and the OFDM symbol 2, and the second OFDM symbol set comprises the OFDM symbol 3;
when the resource for the physical uplink control channel occupies OFDM symbol 0, OFDM symbol 1, OFDM symbol 2, and OFDM symbol 3, one of the following is true regarding the resource for the physical uplink control channel:
the resource for the physical uplink control channel occupies OFDM symbol 0, OFDM symbol 1, OFDM symbol 2, OFDM symbol 3, OFDM symbol 4, OFDM symbol 5, and OFDM symbol 6, N=2, the OFDM symbol 1 and the OFDM symbol 4 are used to carry a DMRS, the N OFDM symbol sets comprise a first OFDM symbol set and a second OFDM symbol set, the first OFDM symbol set comprises the OFDM symbol 0, the OFDM symbol 2, the OFDM symbol 3, and the OFDM symbol 5, and the second OFDM symbol set comprises the OFDM symbol 6;
the resource for the physical uplink control channel occupies OFDM symbol 0, OFDM symbol 1, OFDM symbol 2, OFDM symbol 3, OFDM symbol 4, OFDM symbol 5, OFDM symbol 6, and OFDM symbol 7, N=2, the OFDM symbol 1 and the OFDM symbol 5 are used to carry a DMRS, the N OFDM symbol sets comprise a first OFDM symbol set and a second OFDM symbol set, the first OFDM symbol set comprises the OFDM symbol 0, the OFDM symbol 2, the OFDM symbol 4, and the OFDM symbol 6, and the second OFDM symbol set comprises the OFDM symbol 3 and the OFDM symbol 7;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, and OFDM symbol 8, N=2, the OFDM symbol 1 and the OFDM symbol 6 are used to carry a demodulation reference signal DMRS, the N OFDM symbol sets comprise a first OFDM symbol set and a second OFDM symbol set, the first OFDM symbol set comprises the OFDM symbol 0, the OFDM symbol 2, the OFDM symbol 5, and the OFDM symbol 7, and the second OFDM symbol set comprises the OFDM symbol 3, the OFDM symbol 4, and the OFDM symbol 8;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, and OFDM symbol 9, N=2, the OFDM symbol 2 and the OFDM symbol 7 are used to carry a DMRS, the N OFDM symbol sets comprise a first OFDM symbol set and a second OFDM symbol set, the first OFDM symbol set comprises the OFDM symbol 1, the OFDM symbol 3, the OFDM symbol 6, and the OFDM symbol 8, and the second OFDM symbol set comprises the OFDM symbol 0, the OFDM symbol 4, the OFDM symbol 5, and the OFDM symbol 9;
the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, and OFDM symbol 10, N=3, the OFDM symbol 2 and the OFDM symbol 7 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 6, and the OFDM symbol 8, the second OFDM symbol set comprises the OFDM symbol 0, the OFDM symbol 4, the OFDM symbol 5, and the OFDM symbol 9, and the third OFDM symbol set comprises the OFDM symbol 10;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, and OFDM symbol 11, N=3, the OFDM symbol 2 and the OFDM symbol 8 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 7, and the OFDM symbol 9, the second OFDM symbol set comprises the OFDM symbol 0, the OFDM symbol 4, the OFDM symbol 6, and the OFDM symbol 10, and the third OFDM symbol set comprises the OFDM symbol 5 and the OFDM symbol 11;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=3, the OFDM symbol 2 and the OFDM symbol 9 are used to carry a DMRS, the N OFDM symbol sets comprise a first OFDM symbol set, a second OFDM symbol set, and a third OFDM symbol set, the first OFDM symbol set comprises the OFDM symbol 1, the OFDM symbol 3, the OFDM symbol 8, and the OFDM symbol 10, the second OFDM symbol set comprises the OFDM symbol 0, the OFDM symbol 4, the OFDM symbol 7, and the OFDM symbol 11, and the third OFDM symbol set comprises the OFDM symbol 5, the OFDM symbol 6, and the OFDM symbol 12;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, and OFDM symbol 12, N=2, the OFDM symbol 1, the OFDM symbol 4, the OFDM symbol 7, and the OFDM symbol 11 are used to carry a DMRS, the N OFDM symbol sets comprise a first OFDM symbol set, and a second OFDM symbol set, the first OFDM symbol set comprises the OFDM symbol 0, the OFDM symbol 2, the OFDM symbol 3, the OFDM symbol 5, the OFDM symbol 6, the OFDM symbol 8, the OFDM symbol 10, and the OFDM symbol 12, and the second OFDM symbol set comprises the OFDM symbol 9;

the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=3, the OFDM symbol 3 and the OFDM symbol 10 are used to carry a DMRS, the N OFDM symbol sets comprise a first OFDM symbol set, a second OFDM symbol set, and a third OFDM symbol set, the first OFDM symbol set comprises the OFDM symbol 2, the OFDM symbol 4, the OFDM symbol 9, and the OFDM symbol 11, the second OFDM symbol set comprises the OFDM symbol 1, the OFDM symbol 5, the OFDM symbol 8, and the OFDM symbol 12, and the third OFDM symbol set comprises the OFDM symbol 0, the OFDM symbol 6, the OFDM symbol 7, and the OFDM symbol 13; or the resource for the physical uplink control channel occupies OFDM symbol 0, OFDM symbol 1, OFDM symbol 2, OFDM symbol 3, OFDM symbol 4, OFDM symbol 5, OFDM symbol 6, OFDM symbol 7, OFDM symbol 8, OFDM symbol 9, OFDM symbol 10, OFDM symbol 11, OFDM symbol 12, and OFDM symbol 13, N=2, the OFDM symbol 1, the OFDM symbol 5, the OFDM symbol 8, and the OFDM symbol 12 are used to carry a DMRS, the N OFDM symbol sets comprise a first OFDM symbol set, and a second OFDM symbol set, the first OFDM symbol set comprises the OFDM symbol 0, the OFDM symbol 2, the OFDM symbol 4, the OFDM symbol 6, the OFDM symbol 7, the OFDM symbol 9, the OFDM symbol 11, and the OFDM symbol 13, and the second OFDM symbol set comprises the OFDM symbol 3 and the OFDM symbol 10.

29. The non-transitory computer-readable storage medium of claim 21, wherein a difference between quantities of encoded bits in the first encoded bit sequence that are carried in any two of the part of or all of OFDM symbols is less than or equal to maximum bits that can be carried in a resource element (RE).

* * * * *

UNITED STATES PATENT AND TRADEMARK OFFICE
CERTIFICATE OF CORRECTION

PATENT NO. : 12,101,760 B2
APPLICATION NO. : 16/902201
DATED : September 24, 2024
INVENTOR(S) : Zukang Shen et al.

Page 1 of 1

It is certified that error appears in the above-identified patent and that said Letters Patent is hereby corrected as shown below:

On the Title Page

Item (57), in Column 2, in "Abstract", Line 11, delete "of of" and insert -- of --.

In the Claims

In Column 29, Lines 51-52, in Claim 1, delete "demodulated reference signal (DMRS)," and insert -- demodulation reference signal (DMRS), --.

In Column 34, Lines 16-17, in Claim 11, delete "demodulated reference signal (DMRS)," and insert -- demodulation reference signal (DMRS), --.

In Column 38, Line 24, in Claim 21, delete "$4\leq$" and insert -- $4<$ --.

In Column 38, Lines 47-48, in Claim 21, delete "demodulated reference signal (DMRS)," and insert -- demodulation reference signal (DMRS), --.

Signed and Sealed this
Third Day of December, 2024

Katherine Kelly Vidal
*Director of the United States Patent and Trademark Office*